United States Patent
Zhou et al.

(10) Patent No.: US 10,521,777 B2
(45) Date of Patent: Dec. 31, 2019

(54) CRYPTO DIGITAL CURRENCY (VIRTUAL PAYMENT CARDS) ISSUED BY CENTRAL BANK OR OTHER ISSUER FOR MOBILE AND WEARABLE DEVICES

(71) Applicants: World Award Foundation INC, Wilmington, DE (US); AB Stable Group LLC, Wilmington, DE (US); Mobile Pay, INC, Wilmington, DE (US)

(72) Inventors: Andrew H B Zhou, Tiburon, CA (US); Tiger T G Zhou, Tiburon, CA (US); Zhou Tian Xing, Tiburon, CA (US)

(73) Assignee: WORLD AWARD FOUNDATION INC, AB STABLE GROUP LLC, MOBILE PAY, INC, Wilmington, DE (US)

( * ) Notice: Subject to any disclaimer, the term of this patent is extended or adjusted under 35 U.S.C. 154(b) by 0 days.

(21) Appl. No.: 16/458,387

(22) Filed: Jul. 1, 2019

(65) Prior Publication Data
US 2019/0325407 A1    Oct. 24, 2019

Related U.S. Application Data

(63) Continuation-in-part of application No. 16/205,283, filed on Nov. 30, 2018, which is a (Continued)

(51) Int. Cl.
*G06Q 20/06* (2012.01)
*G06Q 20/40* (2012.01)
(Continued)

(52) U.S. Cl.
CPC ..... *G06Q 20/0658* (2013.01); *G06Q 20/3274* (2013.01); *G06Q 20/4012* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 10,217,037 B1 * | 2/2019 | Di Iorio | G06K 19/041 |
| 2015/0262137 A1 * | 9/2015 | Armstrong | G06Q 20/065 705/41 |

(Continued)

*Primary Examiner* — Daniel I Walsh
(74) *Attorney, Agent, or Firm* — Georgiy L. Khayet

(57) ABSTRACT

Provided is a method for crypto digital currency transfers via a mobile and wearable device. The method may include receiving a transfer request with a transfer amount in crypto digital currency and user identification data associated with the user, retrieving payment data of the user associated with the identification data, generating an optical code encoding the payment data and the transfer amount. The method may continue with providing the optical code on a screen of the mobile and wearable device. On scanning of the optical code, a transfer receiving request is created. The method may continue with receiving the transfer receiving request to perform a payment transaction associated with the user, accessing a user account maintained by a currency issuance unit, and transferring the transfer amount in the crypto digital currency from the user account to a recipient account associated with the recipient identification data.

19 Claims, 10 Drawing Sheets

Related U.S. Application Data continuation-in-part of application No. 15/885,970, filed on Feb. 1, 2018, now Pat. No. 10,147,076, which is a continuation-in-part of application No. 15/486,709, filed on Apr. 13, 2017, now Pat. No. 10,055,714, which is a continuation-in-part of application No. 15/345,003, filed on Nov. 7, 2016, now Pat. No. 9,710,804, and a continuation-in-part of application No. 15/343,227, filed on Nov. 4, 2016, now Pat. No. 9,704,151, said application No. 15/486,709 is a continuation-in-part of application No. 15/345,349, filed on Nov. 7, 2016, now Pat. No. 9,652,758, which is a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.
*G06Q 20/32* (2012.01)
*G06K 19/06* (2006.01)

(52) U.S. Cl.
CPC . *G06K 19/06028* (2013.01); *G06K 19/06037* (2013.01); *G06Q 2220/00* (2013.01)

(56) References Cited

U.S. PATENT DOCUMENTS

| | | | | |
|---|---|---|---|---|
| 2016/0260091 | A1* | 9/2016 | Tobias | G06Q 20/3678 |
| 2017/0132630 | A1* | 5/2017 | Castinado | G06Q 20/4014 |
| 2018/0117447 | A1* | 5/2018 | Tran | A63B 71/145 |
| 2018/0197172 | A1* | 7/2018 | Coburn | G06Q 10/00 |
| 2018/0240086 | A1* | 8/2018 | Sobotka | G06Q 20/06 |
| 2018/0240107 | A1* | 8/2018 | Andrade | G06Q 20/36 |
| 2018/0337882 | A1* | 11/2018 | Li | H04L 61/35 |
| 2019/0018984 | A1* | 1/2019 | Setty | G06F 21/64 |
| 2019/0102756 | A1* | 4/2019 | Zhou | G06Q 20/065 |
| 2019/0108517 | A1* | 4/2019 | Rose | G06Q 20/3829 |
| 2019/0164156 | A1* | 5/2019 | Lindemann | G06Q 20/065 |
| 2019/0238327 | A1* | 8/2019 | Li | G06F 16/1824 |
| 2019/0251524 | A1* | 8/2019 | Sadrizadeh | G06Q 20/065 |

\* cited by examiner

CRYPTO DIGITAL CURRENCY (VIRTUAL PAYMENT CARDS) ISSUED BY CENTRAL BANK OR OTHER ISSUER FOR MOBILE AND WEARABLE DEVICES

CROSS-REFERENCES TO RELATED APPLICATIONS

This application is a continuation-in-part of U.S. patent application Ser. No. 16/205,283, entitled "UN CURRENCY (VIRTUAL PAYMENT CARDS) ISSUED BY CENTRAL BANK OR OTHER ISSUER FOR MOBILE AND WEARABLE DEVICES," filed on Nov. 30, 2018, which in turn is a continuation-in-part of U.S. patent application Ser. No. 15/885,970, entitled "DIGITAL CURRENCY (VIRTUAL PAYMENT CARDS) ISSUED BY CENTRAL BANK FOR MOBILE AND WEARABLE DEVICES", filed on Feb. 1, 2018, U.S. patent application Ser. No. 15/345,003, entitled "VIRTUAL PAYMENT CARDS ISSUED BY BANKS FOR MOBILE AND WEARABLE DEVICES", filed on Nov. 7, 2016, U.S. patent application Ser. No. 15/343,227, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Nov. 4, 2016, U.S. patent application Ser. No. 15/486,709, entitled "DIGITAL CURRENCY (VIRTUAL PAYMENT CARDS) ISSUED BY CENTRAL BANK FOR MOBILE AND WEARABLE DEVICES", filed on Apr. 13, 2017, which is Continuation-in-Part of U.S. patent application Ser. No. 15/345,349, entitled "SYSTEMS AND METHODS FOR MESSAGING, CALLING, DIGITAL MULTIMEDIA CAPTURE AND PAYMENT TRANSACTIONS", filed on Nov. 7, 2016; which is a continuation-in-part of U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546, entitled "DATA PROCESSING SYSTEM", filed on Oct. 1, 2002, which are incorporated herein by reference in their entirety.

FIELD

This application relates generally to data processing, and more specifically, to systems and methods for performing crypto digital currency transfer via mobile and wearable devices.

BACKGROUND

In applying for a payment card, a customer usually has to physically visit a bank, spent some time there filling out a plurality of bank forms and standing in queues. Subsequently, the bank processes a credit card application by evaluating the creditworthiness of an applicant, verifying his credit history and employment information. In addition, the processing of payment cards, for example, carving names and card numbers on a credit card and storing magnetic information on a magnetic stripe of the card, takes a certain amount of time.

Thus, obtaining a payment card after filing an application may be a long-lasting procedure. However, customers may desire to receive a payment card immediately. Additionally, the customers may want to avoid formalities related to issuance of physical plastic payment cards and performing transfers.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to a system and a method for crypto digital currency transfers via a mobile and wearable device. According to one embodiment of the disclosure, a system for crypto digital currency transfers via a mobile and wearable device may include a processor, a currency issuance unit, and a storage unit. The processor may be operable to receive a transfer request from the mobile and wearable device of a user. The request may include a transfer amount in crypto digital currency and user identification data associated with the user. The user identification data may include at least a personal identification number (PIN). The processor may be further operable to retrieve, from a storage unit, payment data of the user associated with the identification data in response to the transfer request. The processor may be operable to generate an optical code encoding the payment data and the transfer amount and provide the optical code on a screen of the mobile and wearable device. The optical code may include one of the following: a barcode and a Quick Response (QR) code. Upon scanning of the optical code, a transfer receiving request is created. The processor may be further operable to receive a transfer receiving request to perform a payment transaction associated with the user. The transfer receiving request may include at least the payment data, the transfer amount, and recipient identification data associated with a recipient. The accessing of the user account maintained by a currency issuance unit may be based on the transfer receiving request. The processor may be further operable to transfer the transfer amount in the crypto digital currency from the user account to a recipient account associated with the recipient identification data. The currency issuance unit may be operable to generate the crypto digital currency based on the payment data associated with the user and the user identification data. The crypto digital currency may have a deposit. The deposit may be equal to the transfer amount requested by the user in the transfer request. The currency issuance unit may be further operable to provide the crypto digital currency to the user account. The storage unit may be operable to store at least the user identification information, the crypto digital currency, and the recipient identification data. The processor, the mobile and wearable device, the currency issuance unit, and the storage unit are remotely located from each other and are in operable connection over the data network.

In another embodiment of the disclosure, a method for crypto digital currency transfers via a mobile and wearable device is provided. The method may commence with receiving over a data network, by a processor, a transfer request. The request may be received from the mobile and wearable device of a user. The request may include a transfer amount and a user identification data associated with the identification data. The user identification data may include at least a PIN. In response to the transfer request, payment data of the user associated with the identification data may be retrieved from a storage unit. The method may continue with generating an optical code encoding the payment data and the transfer amount. The optical code may include one of the following: a barcode and a QR code. The method may further continue with providing the optical code on a screen of the mobile and wearable device. On scanning of the optical code by a device of a receiver, a transfer receiving request may be created. The method may further continue with receiving a transfer receiving request to perform a payment transaction associated with the user. The transaction request may include at least the payment data, the transfer amount, and recipient identification data associated with a recipient. The accessing of the user account may be based on user authentication information provided by the user during registration with the system for crypto digital currency transfers via a mobile and wearable device and stored on the mobile and wearable device. The user account may include a credit card account, a debit card account, a retail card account, a charge card account, a bank saving account, a bank checking account, an insurance account, a stored-value card account, a cryptocurrency account, and a digital mobile currency account. The method may continue with generating an optical code encoding the payment data and the transfer amount based on the retrieving. The optical code may be provided on a screen of the mobile and wearable device of the user for scanning by a device of a recipient. On scanning of the optical code, a transfer receiving request may be created. The method may continue receiving a transfer receiving request to perform a transfer transaction associated with the user. The transfer receiving request may include at least the payment data, the transfer amount, and recipient identification data associated with a recipient. The method may further continue with accessing a user account associated with the payment data of the user maintained by a currency issuance unit based on the transfer receiving request. The method may further include transferring the transfer amount in the crypto digital currency to a recipient account associated with the recipient identification data. The processor, the mobile and wearable device, the currency issuance unit, and the storage unit may be remotely located with each other and be in operable connection over the data network.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
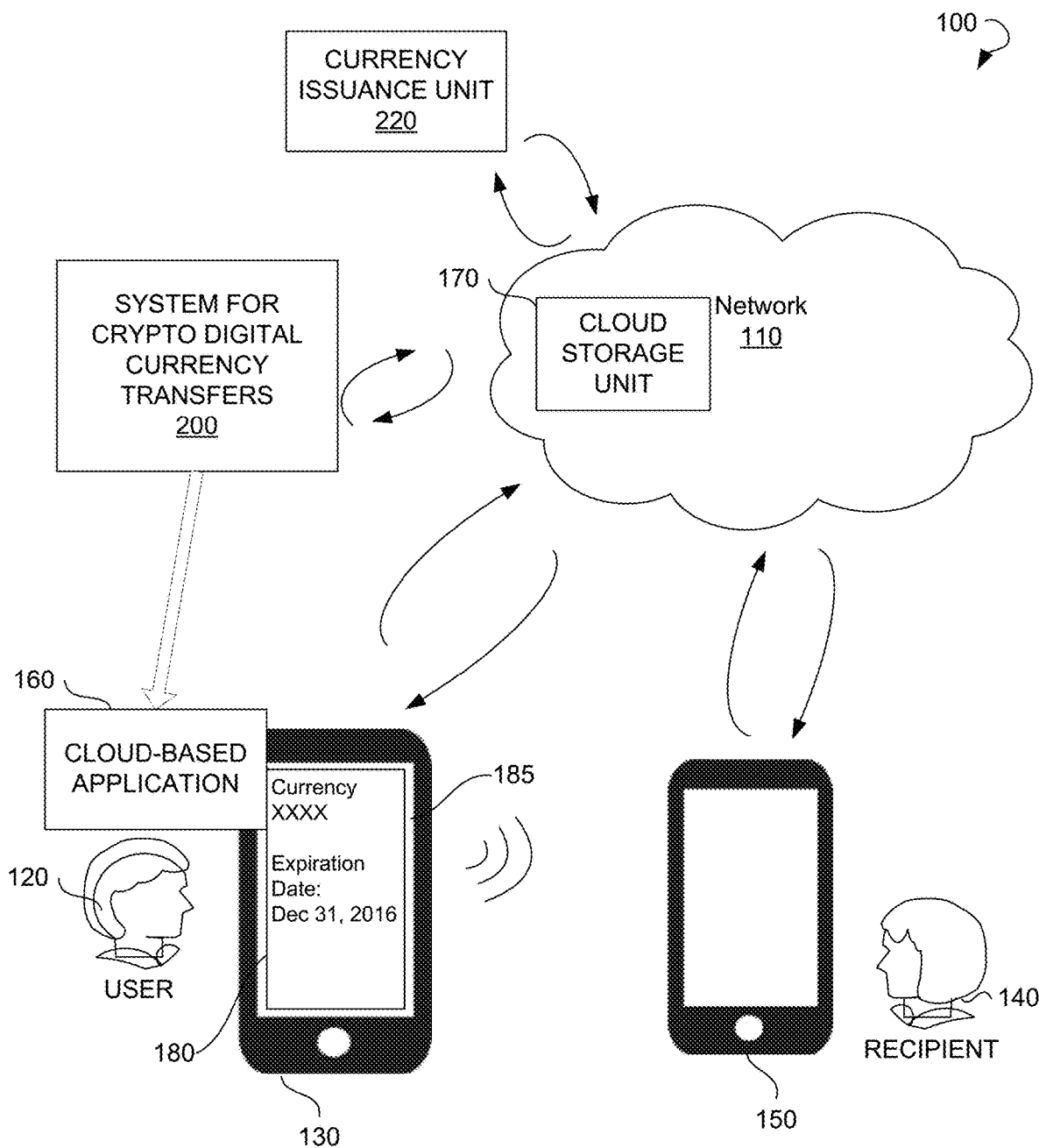
FIG. 1 is a block diagram showing an environment within which methods and systems for crypto digital currency transfers via a mobile and wearable device can be implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for crypto digital currency transfers via a mobile and wearable device are described herein. The crypto digital currency may be issued for a user based on financial data of the user stored or collected by a third-party organization. Therefore, though the user may have an account opened in the third-party organization, there may be no need to issue physical plastic currency, such as Visa, Master Card, American Express, and so forth.

The crypto digital currency may be an electronically issued currency having a unique currency number. The unique currency number may be generated for a specific transaction only. The unique currency number may be electronically generated on request from a web service or a mobile application running on a mobile and wearable device of the user and being in communication with a currency issuance unit. The currency issuance unit may include a bank, Federal Reserve Bank, cryptocurrency issuance unit, or any other third-party organization. The crypto digital currency may be issued for the exact amount of the transaction. Thus, the possibility of fraud related to the account of the user opened in the bank may be significantly reduced. Furthermore, though inherent risks involved with credit currency usage exist, a crypto digital currency may eliminate the risk of compromising the account. More specifically, the crypto digital currency may be generated for a specific transaction or for several transactions within a predetermined time and, after the transaction is completed, the crypto digital currency may become invalid. Therefore, even though data associated with the crypto digital currency may be stolen, the data of the account of the user in the bank cannot be accessed using the stolen data because the crypto digital currency may be deactivated.

Additionally, the user may control spending parameters associated with the crypto digital currency. More specifically, the user may set restrictions related to the crypto digital currency. The restrictions may include a specific money amount allowed to be spent, a range of the money amount allowed to be spent, the number of times the crypto digital currency can be used, such as for a one-time payment or for a payment within a predetermined time limit, persons allowed to use the crypto digital currency, such as a primary holder of the account and a secondary holder of the account, places where the crypto digital currency may be used, such as a specific merchant. By using the restrictions, a risk of an unauthorized use of the crypto digital currency may be reduced.

The crypto digital currency may be also useful for companies and businesses. More specifically, paying bills by a company using a crypto digital currency may result in cost savings, such as money costs related to issuance of physical cards and time and resource saving related to actions taken by a staff of the company. Additionally, a rebate may be provided to the user or the company based on the amount of money spent using the crypto digital currency.

Further, the user may make person-to-person transfers without revealing his banking details. Instead, payment data of the user may be provided in the form of a scannable optical code on a screen of a mobile and wearable device associated with the user.

Moreover, the user may monitor the amount of money spent using the crypto digital currency. Since one crypto digital currency unit is generated for each specific transaction, the generated crypto digital currency may be electronically tracked and reconciled by the currency issuance unit and a report related to the use of crypto digital currency may be provided to the user. Furthermore, analysis of the use of the crypto digital currency by the user may be performed. The analysis may include evaluation of spending of money by the user for a specific time period, the list of recipients that accepted transfers using the crypto digital currency, an average amount transferred to each of the recipients, and the like. In fact, the user may use the crypto digital currency for performing payments related to electronic accounts associated with a plurality of merchants, corporate travel payments, mobile payments, person-to-person transfers, split payments, refunds, reimbursements, fees payments, and so forth.

Referring now to the drawings, FIG. 1 illustrates an environment 100 within which a system and a method for crypto digital currency transfers via a mobile and wearable device can be implemented. The environment 100 may include a network 110, a user 120, a mobile and wearable device 130, a recipient 140, a device 150 associated with recipient 140, and a system 200 for crypto digital currency transfers via a mobile and wearable device, also referred to as the system 200. The system 200 may have a distributed architecture including a cloud-based application 160 running on the mobile and wearable device 130, and a storage unit 170 associated with the mobile and wearable device 130 of the user 120. The mobile and wearable device 130 may include a smartphone, a wearable device (e.g., augmented reality glasses, a smart watch), a tablet computer, a lap top, and so forth.

The device 150 associated with recipient 140 may include a smartphone, a wearable device (e.g., augmented reality glasses, a smart watch), a tablet computer, a lap top, a payment terminal, such as a point of sale terminal, a credit card terminal, a card reader, and any other device that interfaces with currency to make electronic funds transfers and connects to a data network.

The user 120 may access the cloud-based application 160 via the mobile and wearable device 130. The cloud-based application 160 may be provided on a display of the mobile and wearable device 130, or may be projected or otherwise displayed by the mobile and wearable device 130 via a web browser or through another way. The cloud-based application 160 may provide to the user 120 the interface 185. The cloud-based application 160 may include a file hosting service, which may offer cloud storage, file synchronization, personal cloud, and client software.

The user 120 may register with the cloud-based application 160 on the mobile and wearable device 130. During registration, the user may specify user identification data, payment data, and authentication information. The payment data and authentication information may include information related to a credit card account, a debit card account, a charge card account, a bank saving account, a bank checking account, an insurance account, a stored-value card account, a cryptocurrency account, or a digital mobile currency account, or another payment facility of the user. The payment data may be stored in on the mobile and wearable device 130 and the storage unit 170 in association with the user identification data, and authentication information. Upon activation of the cloud-based application 160, the user 120 may initiate a transfer request 180 on the mobile and wearable device 130 and specify a transfer amount. Further, user identification data may be entered by the user 120, retrieved from the memory of the mobile and wearable device 130, or captured by sensors associated with the mobile and wearable device 130, such as fingerprints scanner or face recognition scanners. In an example embodiment, the user identification data further includes a PIN. The transfer request 180 including at least the transfer amount and the user identification data may be sent to the system 200. In response to the transfer request 180, the system 200 may retrieve the payment data of the user 120 associated with the identification data from the storage unit 170.

In some embodiments, based on the transfer request 180 the currency issuance unit 220 may generate the crypto digital currency and provide the crypto digital currency to the account associated with the user. The crypto digital currency (crypto digital currency) may also refer herein to as CDCPAY currency (CDCPAY).

Based on the payment data and the transfer amount, the system 200 may generate an optical code encoding the payment data and the transfer amount and transmit the optical code to the mobile and wearable device 130. The optical code may be provided on a screen of the mobile and wearable device 130 to be scanned by the device 150 associated with the recipient 140. The optical code may include a linear dimensional code, a two-dimensional code, a snap tag code, a barcode, a QR code, and a three-dimensional (3D) CDCcode. The optical code may be integrated in a virtual payment card in the form of a virtual currency note. The virtual payment card may be personalized with an image associated with the user 120. On scanning of the optical code, the payment data and the transfer amount encoded in the optical code may be extracted.

Alternatively, the user 120 may put the mobile and wearable device 130 in a proximity to the device 150 to enable connection between the mobile and wearable device 130 and the device 150. The connection the mobile and wearable device 130 and the device 150 may be established through radio waves, contacts for direct electrical connection, data-strip reading, and so forth. The mobile and wearable device 130 and the device 150 may include one or more of a radio frequency identification chip, a Near Field Communication (NFC) chip, one or more contacts for direct electrical connection, a magnetic data strip, a holographic data strip, and so forth.

Upon establishment of the connection between the mobile and wearable device 130 and the device 150, the payment data and the transfer amount may be sent to the device 150 via the network 110.

Based on the payment data and the transfer amount extracted from the optical code or received via network 110 and recipient identification data stored on the device or entered by the recipient 140, a transfer receiving request may be created. The transfer receiving request may be then sent to the system 200. When the system 200 receives the transfer receiving request, the system 200 may access a user account maintained by the currency issuance unit 220. The transfer amount in the crypto digital currency may be transferred to a recipient account associated with the recipient identification data.

The transfer performed using the crypto digital currency may include an Internet payment, a scan code payment, a person-to-person payment, a buyer-to-merchant payment, a peer-to-peer payment, an in-application payment, a point-of-sale payment, a mobile payment, a wearable payment, a one-touch buying, and a digital wallet payment, and so forth. The payment details may be stored in the cloud storage 170, which may be associated with the currency issuance unit 220, and provided via the cloud-based application 160 in a form of a virtual payment card only to perform the transaction. Thus, the payment details of the user 120 may be protected from a theft or fraud.

Communication between the mobile and wearable device 130, the system 200, and the currency issuance unit 220 may be performed via a network 110. The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus connection or other wired or wireless, digital or analog interface or connection, mesh or Digi® networking. The network 110 may be a network of data processing nodes that are interconnected for the purpose of data communication.

The systems and methods described herein may also be practiced in a wide variety of network environments (represented by the network 110) including, for example, Transmission Control Protocol/Internet Protocol (TCP/IP)-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

The crypto digital currency (also referred to herein as virtual payment cards) is a global mobile and wearable internet currency powered by code block file chain (CBFC) blockchain technology. Users may use the crypto digital currency to buy products or send money to other users and pay little or zero fees. The systems described herein may be used to buy or cash out tokens of the crypto digital currency online or at local exchange points such as grocery stores, and spend the crypto digital currency using interoperable third-party wallet applications working using the Blockchain.

In an example embodiment, a 'Scan to Pay' option may be provided by the cloud-based application to the user. The user may login into the crypto digital currency and choose a 'Scan to Pay' button on a dashboard in the cloud-based application. The cloud-based application may automatically enable a camera of a user device, such as a smartphone. The user may scan a QR code or any barcodes displayed at a merchant outlet or a screen of a further mobile device screen. The user may select one of a plurality of payment methods, which may include paying by Visa, MasterCard or other payment cards or paying using a wallet associated with the cloud-based application.

The barcode/QR Code payment may be an offline instant payment solution for the in-store checkout. This payment method may enable merchants to collect money by scanning the barcode/QR code shown on a screen of a customer device by the wallet associated with the cloud-based application.

The crypto digital currency may be associated with a code block file chain (CBFC) community of a crypto digital currency association (CDC association). Members of the CDC association may vote in respect of governance of issuance of the crypto digital currency. The CDC association may promote an open-sourced Blockchain and a developer platform having a coding programming language, incentivize businesses to accept the crypto digital currency for payment, and incentivize customers by providing discounts and rewards to the customers.

In an example embodiment, the crypto digital currency may be associated with a plurality of payments of the user. Data on the plurality of payments may be unavailable to third parties and unavailable for advertisement targeting. A user identity associated with the user may be invisible to publicly visible transactions. The members of the CDC association may earn interest based on holding the crypto digital currency in a crypto digital currency reserve to keep a value of the crypto digital currency active and stable. The CDC association may use the crypto digital currency reserve to provide a plurality of services to governments and a private sector, such as providing depositories for bank reserves, lending to banks to cover short-term fund deficits, seasonal business cycles, and extraordinary liquidity demands, collecting and clearing payments between banks, issuing bank notes for circulation as currency, administering deposit accounts of the governments, and conducting auctions and buybacks of debt of the governments.

In an example embodiment, the users of the CDC association may be incentivized for making payments in the crypto digital currency. The payments may be associated with one or more of the following: microtransactions associated with a predetermined transaction fee and a pre-paid transit pass.

In an example embodiment, a permission may be set for a member of the CDC association to be a validator node operator of the crypto digital currency, gain a vote in the CDC association, and be entitled to a share of dividends from interest earned on the crypto digital currency reserve into which users pay fiat currency to receive the crypto digital currency.

The members of the CDC association may be incentivized to act as the validator node operator for the Blockchain associated with the crypto digital currency, fundraising, designing incentive programs to reward users and providing social impact grants. The CDC association may have a council, a representative from each member to choose a managing director of the CDC association, appoint an executive team, and elect a board of a predetermined amount of top representatives. The Blockchain associated with the crypto digital currency may be designed to transition a node membership from the members who create an ecosystem of the crypto digital currency to people who hold the crypto digital currency.

Each of the members of the CDC association may have one vote, two votes, or 1% of the total vote to provide a level of decentralization to protect against hijacking of the crypto digital currency, avoid sole ownership and dominion crypto digital currency CDC, avoid extra scrutiny from regulators who investigate privacy abuses and anti-competitive behavior.

In an example embodiment, the value of the crypto digital currency may be associated with a pool of assets including bank deposits and short-term government securities for historically stable international currencies. The historically stable international currencies may include a dollar, pound, euro, Swiss franc, and yen. The CDC association may maintain the pool of assets and changes a balance of composition of the pool of assets to offset price fluctuations in a foreign currency to make the value of the crypto digital currency consistent with the price fluctuations. The CDC association may continuously determine an exact value of the crypto digital currency and keep the crypto digital currency stable in associated with a value of a dollar, euro or pound to conceptualize the crypto digital currency.

In example embodiment, the cloud-based application may receive a request from the user to trade in local currency for the crypto digital currency or trade in the crypto digital currency for the local currency. In response to the request, the local currency may be exchanged for the crypto digital currency or the crypto digital currency may be exchanged for the local currency.

In some example embodiment, a first amount of a local currency may be received from the user. In response to the receipt of the first amount of the local currency, a first amount of the crypto digital currency may be emitted and provided to the user. The first amount of the crypto digital currency may correspond to the first amount of the local currency. The local currency may be provided to a crypto digital currency reserve. Furthermore, a second amount of the crypto digital currency may be received from the user. In response to the receipt of the second amount of the crypto digital currency, a second amount of local currency may be provided to the user and the second amount of the crypto digital currency may be destroyed in the Blockchain.

Additionally, a membership fee maybe received from members of the CDC association. Investment tokens may be provided to the members in response to the receipt of the membership fee. A share of the investment tokens may be translated into a proportion of a dividend the members earn of an interest on assets in the crypto digital currency reserve. The dividend may be paid out to the members after operating expenses, investments in the ecosystem, engineering research and grants are paid by the CDC association.

Each payment in the crypto digital currency may be permanently written into the Blockchain. The Blockchain is a cryptographically authenticated database that acts as a public online ledger configured to handle a predetermined number of transactions per second. The Blockchain is operated and constantly verified by the members of the CDC association operating as a validator node operator. The Blockchain tracks an amount of the crypto digital currency.

Upon submission of a transaction in the crypto digital currency, each of nodes of nodes of the Blockchain may run a calculation based on an existing ledger of all transactions. Two-thirds of the nodes may determine the transaction to be legitimate for the transaction to be executed and written to the Blockchain. Transactions in the crypto digital currency are unreversable. When over one-third of the nodes are compromised by an attacker, a fork of nodes is created in the Blockchain to temporarily halt transactions, determine an extent of a damage, and recommend updates to the Blockchain to resolve the compromising.

The Blockchain is open source to enable developers to build applications that work with the Blockchain using a coding language. The applications may be configured to move the crypto digital currency between accounts and avoid duplication of the crypto digital currency. The developers may create smart contracts for programmatic interactions with the Blockchain. The CDC association may encourage developers and merchants to work with the crypto digital currency by issuing incentives to validator node operators for signing users for using the crypto digital currency. The user may be awarded for using wallets of the crypto digital currency for over half year. For each transaction, merchants may receive a percentage of an amount of the transaction. The users may accumulate incentives and pass a portion or all of the incentives to users in the form of free crypto digital currency or discounts on purchases to the users. The merchants may provide a discount for the user for paying in the crypto digital currency. The user may receive an additional amount of the crypto digital currency when the user completes a predetermined number of transactions within a predetermined period. In an example embodiment, the core transaction code may be written as follows: CDCAccount.pay_from_sender(recipient_address, amount) procedure.

A plurality of wallets associated with the crypto digital currency maybe provided in the cloud-based application. The wallets may be built by third parties. The wallets may be used to send money between users and pay for a product or a service. The wallets may be installed in the cloud-based application and the user registers in the cloud-based application using an anti-fraud procedure by providing a government-issued photo ID and verification information associated with the user.

The user may use the cloud-based application to exchange the local currency to the crypto digital currency, select a user or a merchant to send the crypto digital currency, set an amount of the crypto digital currency to send, and add a description of a transaction made in the crypto digital currency. The user uses the cloud-based application to request to pay to the merchant for products and services at a merchant outlet. Transactions in the crypto digital currency are made securely from a bank account of the user.

The merchant may receive payments from the user by scanning the QR code using a camera of a wearable device of the merchant. The QR code provides a contactless payment by scanning the QR code displayed by the cloud-based application on the screen of the wearable device.

Figure 2:
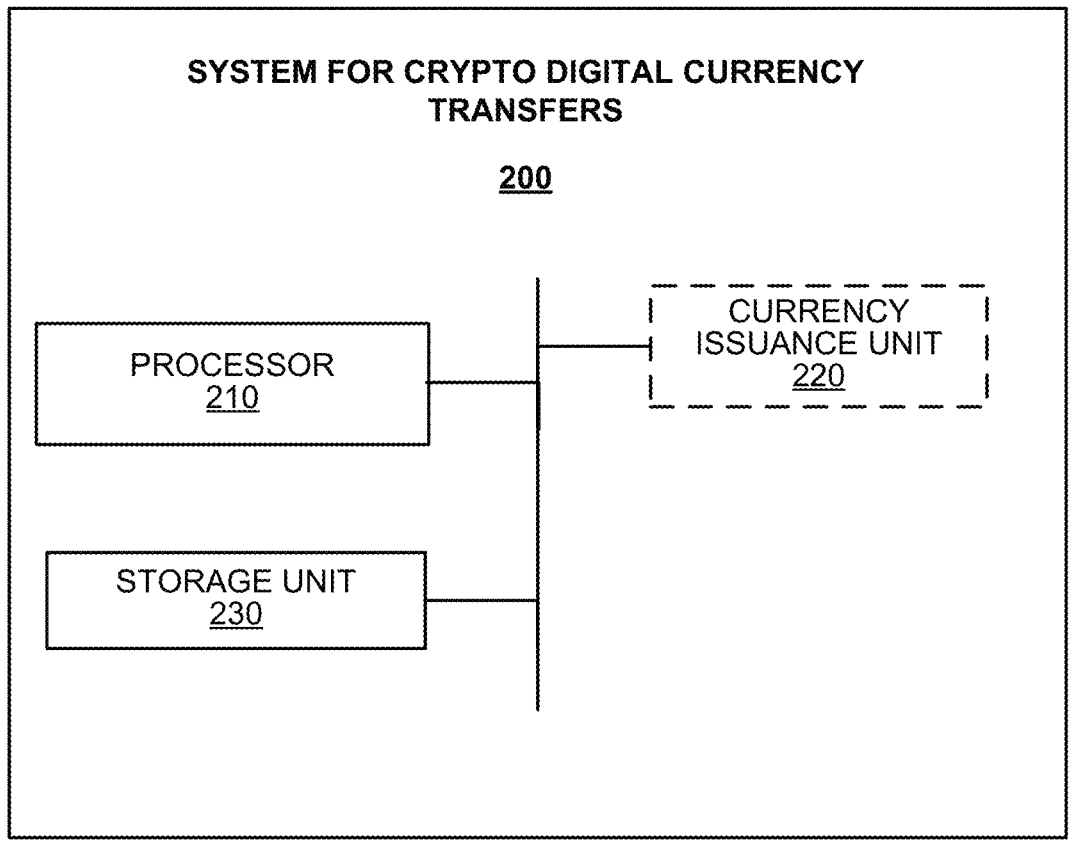
FIG. 2 is a block diagram showing a system for crypto digital currency transfers via a mobile and wearable device, in accordance with an example embodiment.

FIG. 2 is a block diagram showing various modules of a system 200 for crypto digital currency transfers via a mobile and wearable device, in accordance with certain embodiments. Specifically, the system 200 may include a processor 210, a currency issuance unit 220, and a storage unit 230. Operations performed by each of the processor 210, the currency issuance unit 220, and the storage unit 230 are described below with reference to FIG. 3. The storage unit 230 of the system 200 may be operable to store at least the user identification data, the user authentication information, the crypto digital currency, the recipient identification data, and any other information related to the user, the recipient, or a payment transaction.

Figure 3:
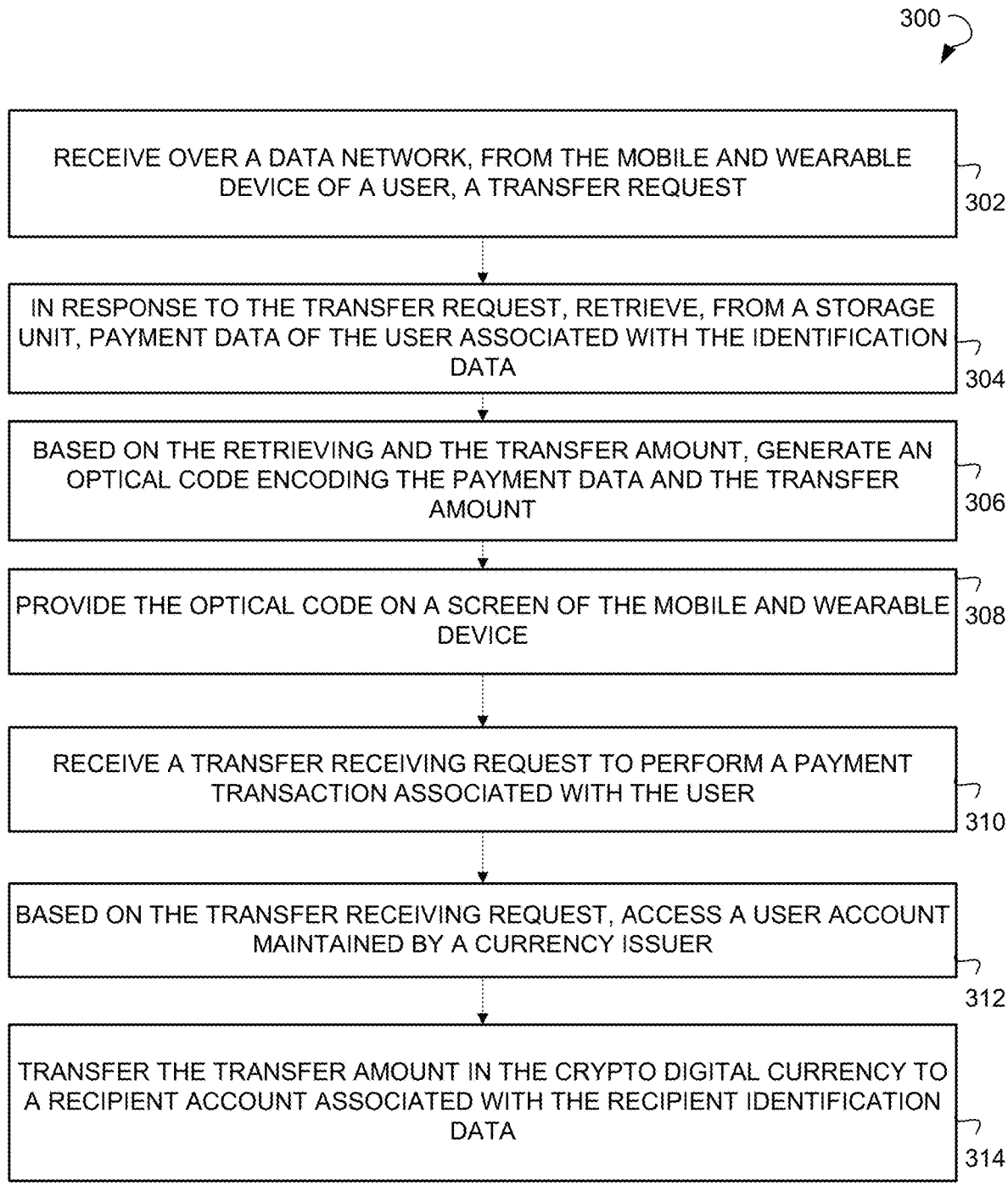
FIG. 3 is a flow chart illustrating a method for crypto digital currency transfers via a mobile and wearable device, in accordance with an example embodiment.

FIG. 3 is a flow chart illustrating a method 300 for crypto digital currency transfers via a mobile and wearable device, in accordance with certain embodiments. The method 300 may commence with receiving over a data network, by a processor, from the mobile and wearable device of a user, a transfer request at operation 302. Transfer request may include a transfer amount in crypto digital currency and user identification data associated with the user. The crypto digital currency may be issued based on the transfer request in the amount corresponding to the transfer amount and deposited to an account associated with the user.

In some embodiments, the user may be prompted to enter user authentication information. The user authentication information may be received from the user by the processor. In an example embodiment, the user authentication information includes one or more of the following: a name of the user, an address of the user, a guarantor name, a social security number of the user, a phone number of the user, an identification number of the user, a bank account of the user, an insurance account number of the user, a photograph of the user, an email account of the user, biometric authentication, and so forth. The biometric authentication may include one or more of a fingerprint authentication, authentication based on facial recognition, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage. Authentication based on facial recognition may include three-dimensional (3D) face recognition, where information of the shape of a face is captured using 3D sensors and compared to one or more approved faces. The one or more approved faces may be stored in the cloud storage.

The method 300 may continue with retrieving, from a storage unit, payment data of the user associated with the identification data in response to the transfer request at operation 304. The payment data may include a payment account associated with a credit card or a debit card of the user. In an example embodiment, the payment data may include data associated with one or more of the following: a credit card, a debit card, a retail card, a charge card, a bank saving account, a bank checking account, an insurance account, a stored-value card, a digital mobile currency, a cryptocurrency account, and so forth. The currency issuance unit may be selected from one or more of the following: a bank, Federal Reserve Bank, a credit card company, an insurance company, a credit union, a store, a third-party organization, a public transaction database, a distributed ledger, and so forth.

The method 300 may further include an operation 306, at which based on the retrieving, an optical code encoding the payment data and the transfer amount is generated. At operation 308, the optical code may be provided on a screen of the mobile and wearable device. The optical code may include one or more of the following: a linear dimensional code, a two-dimensional code, a snap tag code, a QR code, 3D CDCcode, and so forth. The optical code may be included in a virtual payment card associated with the transfer amount and the crypto digital currency. The virtual payment card may be displayed via an interface of the mobile and wearable device. The virtual payment card may be read by a device associated with the recipient. In a further example embodiment, the payment data and the transfer amount associated with the transfer may be transmitted from the mobile and wearable device to the device associated with the recipient using an NFC upon bringing the mobile and wearable device and the device associated with the recipient into proximity to each other.

More specifically, the method 300 may include receiving an indication that the user brings the mobile and wearable device in proximity to the device associated to initiate sending data related to the transfer to the recipient. The indication may be received based on sensing an interaction of the mobile and wearable device with the merchant device. The interaction may include at least an NFC. The NFC may be used to pair the mobile and wearable device and the device upon bringing the mobile and wearable device into proximity to the device. The mobile and wearable device and the device may be connected to a cloud network. Upon pairing the mobile and wearable device with the device, at least a Bluetooth connection between the mobile and wearable device and the device may be established.

On obtaining the payment data and the transfer amount, a transfer receiving request may be created using the payment data, the transfer amount, and the recipient identification data.

The method 300 may further include, receiving a transfer receiving request to perform a payment transaction associated with the user at operation 310. The transaction request may include at least the payment data, the transfer amount, and recipient identification data associated with a recipient. The recipient identification data may be retrieved from the device associated with the recipient.

Further, the method may include accessing, by the processor, a user account maintained by a currency issuance unit at operation 312. The accessing may be performed based on the user authentication information provided by the user.

Crypto digital currency is an asset represented in the digital form and having one or more monetary characteristics. Crypto digital currency may be denominated to a sovereign currency and issued by a currency issuance unit responsible to redeem digital money for cash. Crypto digital currency issued by country Central Bank (e.g. Federal Reserve Bank, European Central Bank, Bank of Canada, People's Bank of China, a central bank of 206 countries, other legal authorities, etc.) is a legal tender. Similar to the paper notes and coins, crypto digital currency or digital money exhibits properties. At the same time, the crypto digital currency may allow for instantaneous transactions and borderless transfer-of-ownership. Both virtual currencies and cryptocurrencies are types of digital currencies. Like traditional money, the virtual or crypto digital currency may be used to buy physical goods and services while being restricted to certain communities, such as, for example for use inside an on-line game community or a social network.

There are more than trillion United States currency banknotes issued. An estimated cost for printing and circulation of every paper note is about 25 cents. Every five years a paper note must be reprinted again. In contrast to a paper note, the price of issuing digital money may be less than one cent. The use of crypto digital currency may reduce the number of bank branches and ATM machines. Issuing crypto digital currency per client request using client's mobile device may result in replacing transactions performed via physical plastic cards with transactions in crypto digital currency.

In the present disclosure, the term "CDC currency" means "crypto digital currency" and refers to a crypto digital currency that may include a universal currency used in a plurality of countries (e.g., all counties of the words, a portion countries of the word), a plurality of geographic regions, continents, or parts of the world (e.g., Europe, Asia, Eurasia, America, Oceania, and the like), and one or more currency unions (e.g., Eurozone). For example, the euro is the official currency of 19 of 28 member states of the European Union and some of the territories of the European Union, this group of states is known as the eurozone or euro area. Similarly, to the euro used in a number of countries, the CDC currency may be used throughout the whole world. In an example embodiment, the CDC currency may include one or more of physical currency available in form of banknotes and coins and crypto digital currency available in digital form. Therefore, the CDC currency may be an official crypto digital currency of a group of 206 countries and one or more territories of the Earth. The group of countries may be known as a CDC zone or a CDC area and may be associated with the largest most traded crypto digital currency market.

The CDC currency may facilitate electronic funds transfers throughout the world using one or more of CDC-branded credit cards, gift cards, and debit cards, CDC issues cards, extend credits and set rates and fees for customer. The CDC currency may provide financial institutions with CDC-branded payment products to be uses to offer credits, debits, prepaid and cash-access programs to the customers. Transaction in the CDC currency worldwide may be processed through a CDCPAY Net system at one or more secure facilities. The CDC currency may be associated with UN data centers secured against natural disasters, crime, and terrorism, that may operate independently of each other and from external utilities, handle up to 35,000 simultaneous transactions and up to 100 billion computations every second. Every transaction may be checked past 500 variables including 100 fraud-detection parameters including a location and spending habits of the customers and a merchant location.

The CDC currency may be associated with signed copies of sales drafts included in each customer monthly billing statement for verification purposes. The CDC currency may be associated with a summary statement showing a posting date, a purchase date, a reference number, a merchant name, and a dollar amount of each purchase. The CDC currency may be further associated with a calculation of a finance charge on an unpaid balance shown on a prior month statement. The CDC currency may be associated with an average daily balance resulting in increased revenue for issuers by calculating a number of days each purchase was included on a prior month statement, in which transactions from previous and current billing cycles were used in the calculation. The CDCPAY currency may have a set of rules that govern a participation of financial institutions in a payment system associated with CDCPAY currency. Acquiring banks may be responsible for ensuring that merchants comply with the rules. The rules associated with the CDCPAY currency may address how a device holder or the cardholder is to be identified for security, how transactions are denied by a bank and how banks cooperate for fraud prevention, and how to keep identification and fraud protection standard and non-discriminatory. The rules may govern what creates an enforceable proof of authorization by the device holder or the cardholder. Furthermore, the rules associated with the CDCPAY currency may prohibit merchants from imposing a minimum or maximum purchase amount in order to accept, by a user of a mobile or wearable device, from charging device holders, a fee for using CDC virtual card payments. Additionally, a discount for users of the CDCPAY currency may be permitted under the rules. Furthermore, the rules associated with the CDCPAY currency may permit merchants to ask for a photo identification (ID). When the CDC virtual card is signed, a merchant may not deny a transaction if a CDC virtual cardholder refuses to show the photo ID. The rules may further include addition of exceptions for non-signed purchases by telephone or on the Internet, and an additional security system for purchases on the Internet is enforced.

The CDCPAY currency may be associated with a contactless payment technology enabling device holders to wave a wearable device in front of contactless payment terminals without the need to physically swipe or insert a virtual card into a point-of-sale device, using RFID technology. The CDCPAY currency may be associated with a chip-only and a PIN-only debit card.

Additionally, the CDCPAY currency may be associated with a mobile payment application or a wearable device application enabling payments via smartphones using a QR code and machine readable codes. In addition, the CDCPAY currency may be associated with an CDCPAY checkout system including an online or offline payment system for removing the need to share card details with retailers. The CDCPAY checkout system may enable users to enter all user personal details and card information upfront, use a single username and password to make purchases from online or offline retailers. The CDCPAY checkout system may work with credit cards, debit cards, and prepaid cards. The rules associated with the CDCPAY currency may stipulate a user signature requirement to be optional for all Europay, MasterCard and VISA (EMV) contact or contactless chip-enabled merchants, thereby leading to a faster in-store purchase experience of the customers.

The method 300 may continue with transferring the transfer amount in the crypto digital currency to a recipient account associated with the recipient identification data at operation 314.

In an example embodiment, the transfer may be associated with an internet payment, an NFC payment, a scan code payment, a person-to-person payment, a buyer-to-merchant payment, a peer-to-peer payment, an in-application payment, a point-of-sale payment, a mobile payment, a wearable payment, a digital wallet payment, and so forth.

Based on the transfer of the transfer amount, the processor may determine that the transfer associated with the user is completed.

In an example embodiment, the processor may deactivate the crypto digital currency based on the determining that the transfer is completed.

In an example embodiment, the method 300 may include encrypting the transfer request to obtain an encrypted transfer request. The encrypting of the transfer request may include generating a one-time code. The one-time code may encode at least the user identification data and the transfer amount.

In an example embodiment, the transfer receiving request may be authorized when a geographic location determined by the mobile and wearable device matches a geographic location of the recipient at a time of receiving the transfer receiving request.

In further example embodiments, the method 300 may include securing the mobile and wearable device via a band to a part of a human body. The part of the human body may include one or more of the following: a wrist, an arm, a neck, a bead, a leg, a waist, an ear, and a finger. The mobile and wearable device may be secured under, within or on clothing.

In further example embodiments, the method 300 may include setting, by the currency issuance unit, a validity period for the crypto digital currency. The validity period may be pre-selected by the user and stored in the user account. In this embodiment, the deactivation of the crypto digital currency may be performed upon expiration of the validity period.

In some example embodiments, the cloud-based application may include one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize the multimedia with a portable device and one or more internet-connected devices. The cloud-based application may be configured to prompt the user to purchase and download one or more or the following: music, music videos, television shows, audio books, movies, movie rentals, and the like.

In further example embodiments, the cloud-based application may reside in the cloud network and may be provided on the mobile and wearable device via a web browser, a projector, or a hologram. The cloud-based application may be provided for purchase in one or more applications stores. The one or more applications stores may be associated with an operating system including one of the following: Microsoft Windows, Linux, Android, Blackberry, iOS, Windows Phone, and so forth. In some example embodiments, the cloud-based application may be provided free of charge or at a predetermined price.

In a further example embodiment, the crypto digital currency may be associated with a joint operation with banks and top retailers. Additionally, the cloud-based application running on the mobile and wearable device may reside in a cloud network and may be provided on the mobile and wearable device via one or more of the following: a web browser, a projector, and a hologram, an augmented reality (AR) device, and a virtual reality (VR) device. The cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone. The cloud-based application may be provided free of charge or at a predetermined price. The cloud-based application may include at least a bank account emulation (BAE) client, the BAE client is configured to provide emulation of a bank account to combine with cloud computing and provide an emulated crypto digital currency. The bank account may be emulated based on metadata associated with the user, a phone number associated with the user, and data associated with a point-of-sale (POS) terminal of the merchant. The BAE client may be configured to provide a virtual representation of an emulated bank account.

The operating system associated with the mobile and wearable device may be configured to run the BAE client, provide two communication paths for NFC commands from the POS terminal based on an application identifier (AID) associated with the BAE client. The operating system may be further configured to use the AID to route the NFC commands to the cloud-based application managing the emulation of the bank account.

When the user presents the emulated crypto digital currency for transaction, an NFC command may be routed to the BAE client for verification of the NFC commands by the cloud-based application managing the emulation of the bank account.

The cloud-based application may be configured to connect to a backend associated with the currency issuance unit to complete the transaction. The cloud-based application may be associated with a trusted tokenization node. The trusted tokenization node may be a shared resource used to generate and de-tokenize tokens representing data associated with the crypto digital currency at the backend associated with the issuer. The BAE client may provide multi-level security by providing limited use keys, tokenization, device fingerprinting, and dynamic risk analysis. The limited use keys may be derived from a master domain key shared by the issuer. A use of the limited use keys may be associated with time to live of the limited use keys and a number of transactions to be performed using the limited use keys. The device fingerprints may be profiles associated with the mobile and wearable device and are used to determine that transactions are initiated only by an authorized mobile and wearable device at recognized locations of the POS terminal.

Figure 4:
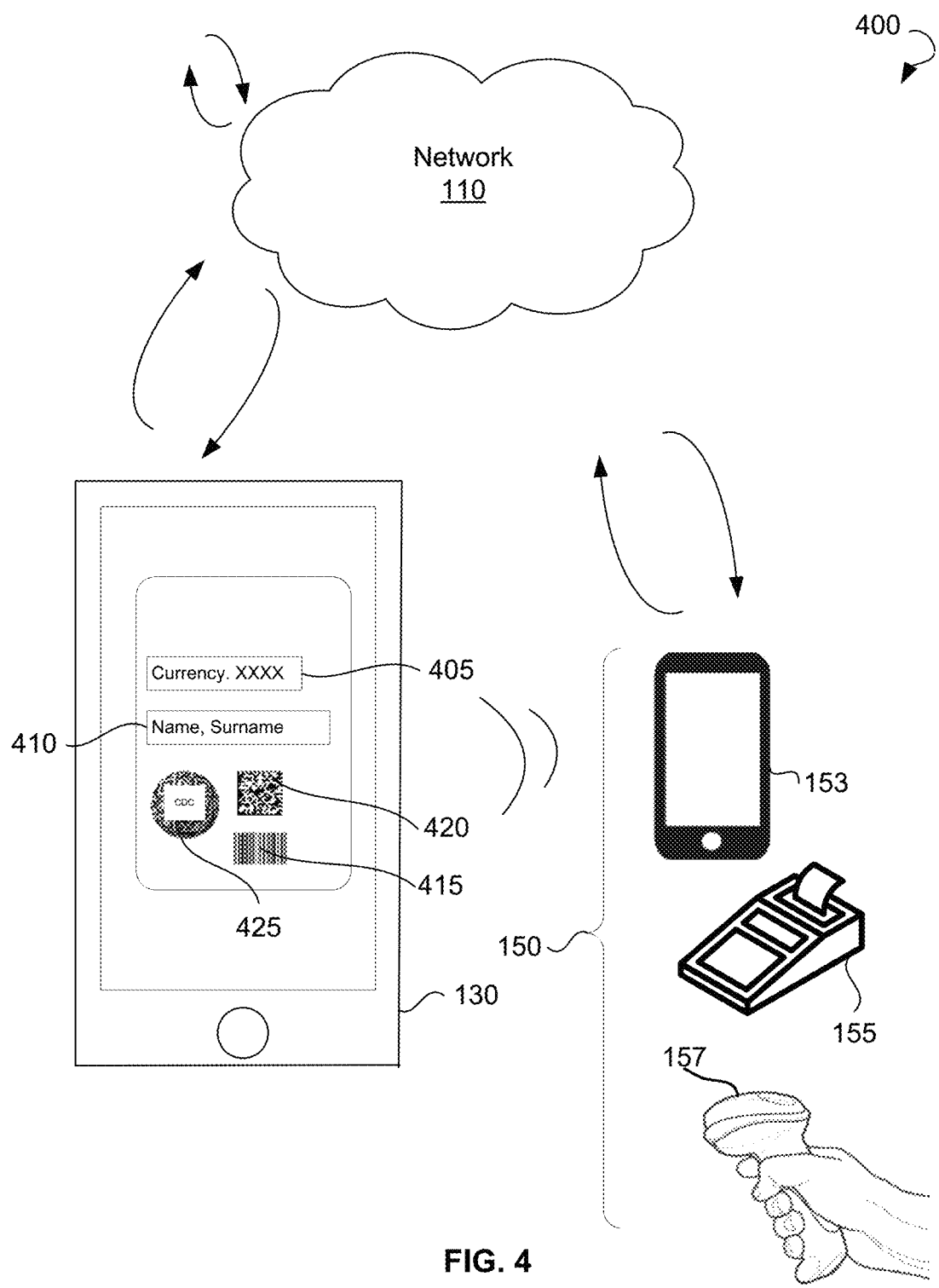
FIG. 4 illustrates a schematic diagram of an interaction of a mobile and wearable device and a device associated with a recipient during a crypto digital currency transfer, in accordance with an example embodiment.

FIG. 4 is a schematic representation 400 of an interaction of a mobile and wearable device and a device during a crypto digital currency transfer, in accordance with an example embodiment. In an example embodiment, a user initiates a transfer request, for example, by activating a cloud-based application (not shown) running on the mobile and wearable device 130. The transfer request may be sent to the system 200 via the network 110. The system 200 may generate an optical code encoding the payment data and the transfer amount in crypto digital currency.

The optical code may be provided on a screen of the mobile and wearable device 130. The user may bring the mobile and wearable device 130 in proximity of the device 150 associated with the recipient so that the mobile and wearable device 130 and the device 150 may establish a connection via scanning, NFC, RFID, and so forth. When the interaction is determined by the device 150, the device 150 may receive data associated with the transfer from the mobile and wearable device 130. In an example embodiment, the device 150 may include a mobile device 153, a point-of-sale card reader 155, a barcode reader 157, and so forth.

In an example embodiment, the data associated with the transfer may include a currency number 405, a name 410 of the user, and a code, such a barcode 415, a QR code 420, or a 3D CDCcode 425. The 3D CDCcode 425 may be associated with the CDCPAY, a virtual currency issued and controlled by developers of the CDCPAY, and used and accepted among members of a virtual community associated with the CDCPAY.

The 3D CDCcode may be readable by an imaging device and may include a round global circle and squares arranged in a round circle grid on a white background. Further, the 3D CDCcode may be a machine-readable optical label encoding information in horizontal, vertical, and 3D components of the round global circle and squares arranged in a round circle grid. The information may be encoded using five standardized encoding modes including globeing, numeric, alphanumeric, byte/binary, and kanji to store data.

The application of the 3D CDCcode may include product tracking, item identification, time tracking, document management, general marketing, payments, storing bank account information or credit card information, cryptographic currencies, and so forth. Payment addresses, cryptographic keys, and transaction information may be shared between digital wallets using the 3D CDCcode.

Upon receipt of the data associated with the transfer, the device 150 may send the data associated with the transfer and the recipient identification information to the system 200 to complete the transaction.

The present disclosure further relates to a computer implemented method for multimedia capture, payment transactions, digital global ledger and national currency digital token for mobile and wearable devices. The method may include receiving, by one or more processors, a first input of a user. In response to the first input of the user, one or more sensors may be initiated to capture multimedia to obtain captured multimedia. The method may continue with receiving, by the one or more processors, a second input of the user. The first input of the user may include a touch engagement of the user with a display of a mobile and wearable device and the second input of the user may include a touch release of the user from the display of the mobile and wearable device. The method may further include analyzing, by the one or more processors, data associated with the first input of the user and the second input of the user. The analyzing may include determining time between the first input of the user and the second input of the user. Based on the analysis, a multimedia capture mode or a payment transaction mode may be selectively selected. The multimedia capture mode may be used to capture multimedia content. The selection of the multimedia capture mode and the transaction mode may be determined by comparison of the time between the first input and the second input with a predetermined time. Only a multimedia storing mode or a transaction mode can be selected at a single time. The multimedia capture mode may be associated with a plurality of types of multimedia. Each of the plurality of types of multimedia may be determined by the time between the first input and second input in the multimedia capture mode. Furthermore, based on the analysis, one of multimedia storing modes or a payment transaction mode may be selectively selected by the one or more processors. Each of the multimedia storing modes may be associated with at least one of a plurality of types of the multimedia. In response to the selection of the multimedia capture storing modes, the captured multimedia may be processed to obtain a type of the multimedia captured in the multimedia capture mode.

The method may continue with storing the type of the multimedia captured and the captured multimedia to a database to obtain a stored type of the multimedia. The method may further include receiving, in response to the selection of the payment transaction mode, transaction data. The transaction data may include at least a payment amount and a recipient. Based on the transaction data, user payment data, and recipient payment data, a payment transaction may be performed. The user payment data and the recipient payment data may be stored in the database.

The mobile and wearable devices may include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body may include a wrist, an arm, a neck, a head, a leg, a waist, an ear, a finger, and any other part of the human body. The band may be adapted to secure the wearable device under, within or on clothing, and the band may include a rechargeable battery configured to power the wearable device.

The method may further include the use of a crypto digital currency. More specifically, the method may include receiving, by at least one processor, a transfer request. The transfer request may be authorized upon receiving authorization data from a sender having a sender account from which funds are transferred from. The authorization data may include a password, a PIN code, and biometric data comprising a face of the sender. Based on the receiving, the sender may be authorized to provide the transfer request when the authorization data provided for the transfer request matches previously registered corresponding authorization data. The transfer may be associated with an amount represented in tokens of the crypto digital currency stored on the mobile and wearable device of the sender. The transfer request may include at least the sender account, a recipient account, and the amount. Based on the transfer request, prior to transferring, the crypto digital currency may be encrypted by assigning a unique key to the transferring and signing the crypto digital currency using a cryptographic signature the amount from the sender account to the recipient account. The tokens stored on the mobile and wearable device of the sender may be printed with a face of the sender. Upon transfer from the mobile and wearable device of the sender to a mobile and wearable device of the recipient, the tokens may be converted by replacing the senders face with the recipient face. The crypto digital currency may be not a currency of any national government but may be operable to be exchanged by the mobile device into a user defined national currency.

Transactions in the crypto digital currency between parties may be recorded in a distributed world global crypto digital currency ledger. The distributed world global crypto digital currency ledger may be programmed to trigger transactions between the parties automatically using a peer-to-peer network, a distributed timestamping server, and a code block file chain database including a transaction database for using the crypto digital currency. The crypto digital currency may be associated with an exchange rate between two digital currencies. The exchange rate is a rate at which one crypto digital currency is exchanged for another crypto digital currency. The exchange rate may be determined in a foreign exchange market, the foreign exchange market being open to a plurality of types of buyers and sellers. A currency trading may be continuous, i.e. may last for days and nights without interruption. The exchange rate may include a spot exchange rate associated with a current exchange rate. The exchange rate may further include a forward exchange rate including an exchange rate that is quoted and traded on a current date for delivery and payment on a specific future date. The exchange rate may further include a buying rate and a selling rate. The buying rate is a rate at which a person buys foreign currency in exchange for the crypto digital currency, and the selling rate is a rate at which the person sells the crypto digital currency.

Figure 5:
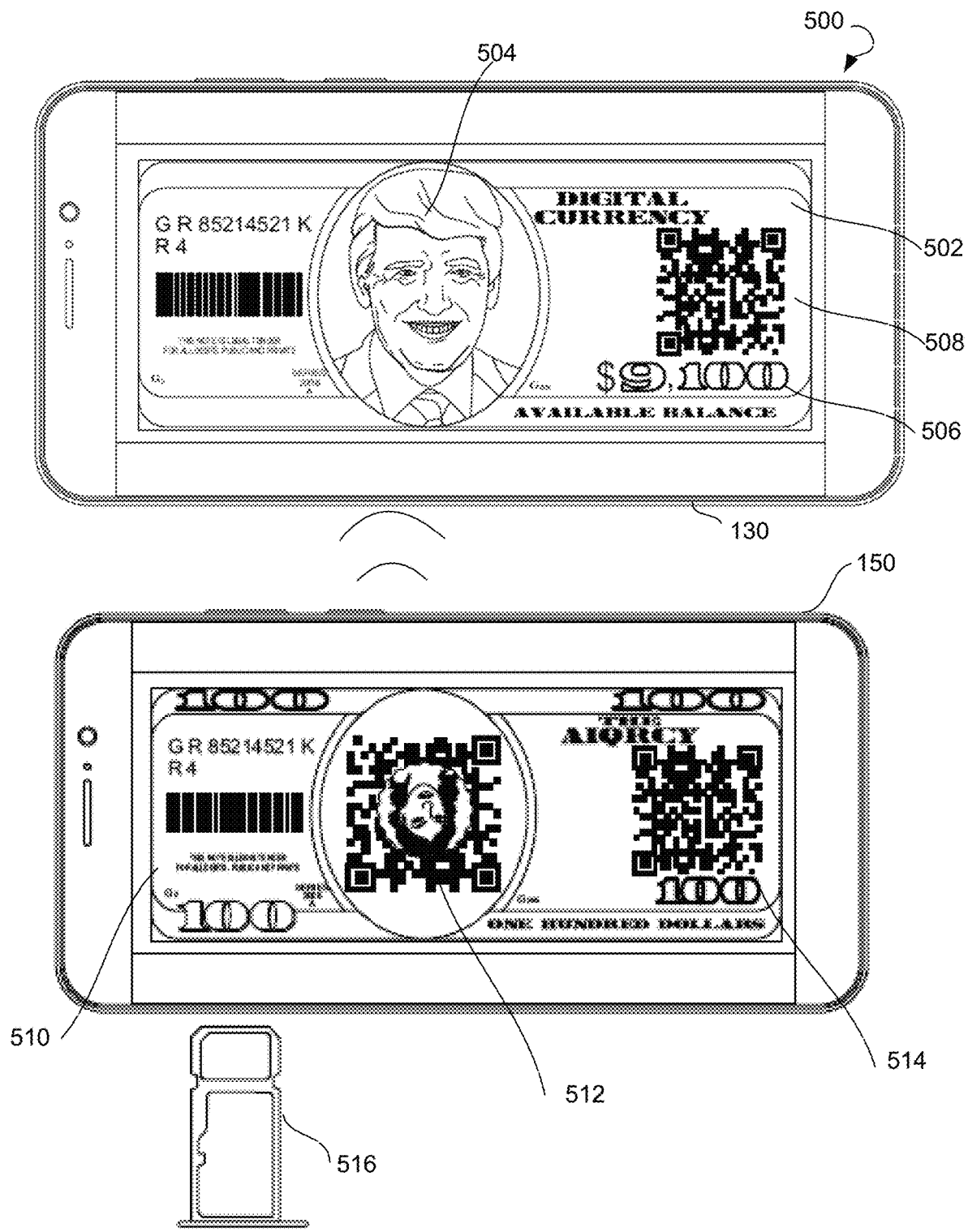
FIG. 5 illustrates a schematic representation of interactions between a user device and a device associated with the recipient, in accordance with an example embodiment.

FIG. 5 illustrates a schematic representation 500 of interactions between a user device 130 and a device 150 associated with the recipient, in accordance with an example embodiment. The screen of the user device 130 may display a virtual payment card 502 representing the crypto digital currency, in which the transfer is being performed. Though the crypto digital currency may be available only in digital form and may have no physical form, virtual payment cards representing the crypto digital currency may be similar to a note of physical currency, for example, a US currency banknote. Additionally, the virtual payment cards may provide personalization options not available with physical currency banknotes even for governors or presidents of the countries issuing the physical currency. For example, the user may his face on a virtual currency card resembling a banknote of a physical currency as shown on FIG. 5.

Further, a virtual payment card may include two sides, one showing a total balance on an account associated with the user and resembling a banknote of a physical currency personalized with an image provided by the user, for example, an image of the President of the United States of America, Donald Trump. The other side may be provided on a touch interaction with the screen of user device 130 and personalized with an image of the user to authorize the transaction based on face recognition.

The virtual payment card 502 may include an image 504 associated with the user, a transfer amount 506, and an optical code 508 encoding transfer data.

Upon scanning of the optical code 508 by the device 150, the transfer data is derived from the optical code 508. Based on the deriving, a virtual payment card 510 may be generated and displayed on the screen of the device 150 via the interface of the cloud-based application related to the recipient. In an example embodiment, the virtual payment card 510 may be personalized with an image 512 associated with the recipient. Further, the transfer amount 506 may be converted based on a currency associated with the cloud-based application related to the recipient. The virtual payment card 510 may include a converted amount 514. Further, the device 150 may include a Subscriber Identity Module card 516, via which the device 150 may communicate with the network.

Figure 6:
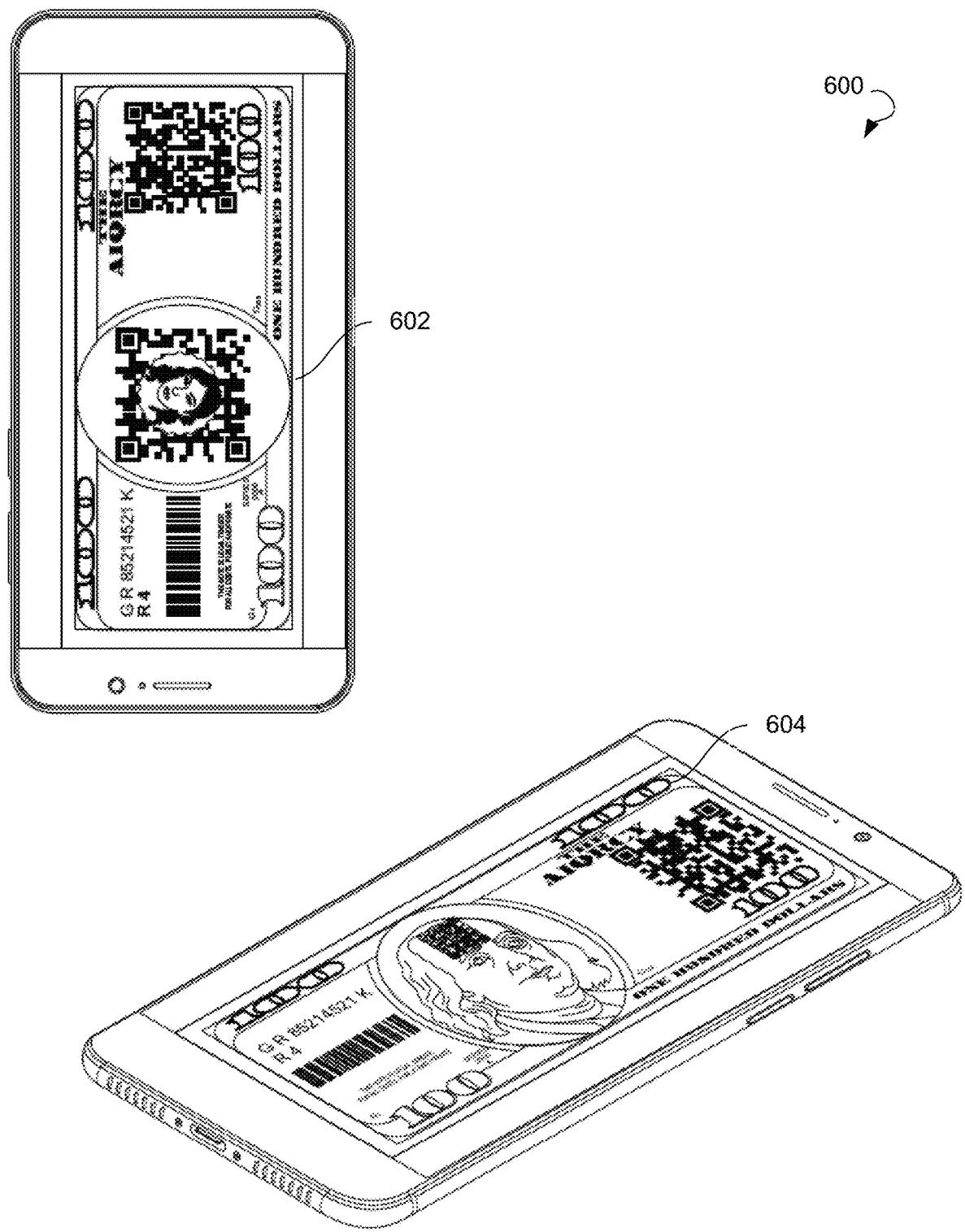
FIG. 6 illustrates further representations of virtual payment cards, in accordance with an example embodiment.

FIG. 6 illustrates further representations 600 of virtual payment cards, in accordance with an example embodiment.

A virtual payment card 602 may be personalized using an image embedded in an optical code. The user may provide at least one image to be depicted on the virtual payment card 602. The image may include an image of a face of the user, an image of a public figure, e.g. current President Donald Trump, an image of a movie character, and other images with optical code like 1D, 2D and 3D CDCcode associated with CDCPAY.

In another embodiment, a virtual payment card 604 may be similar to a note in a physical currency. The virtual payment card 604 may include one or more optical codes.

Figure 7:
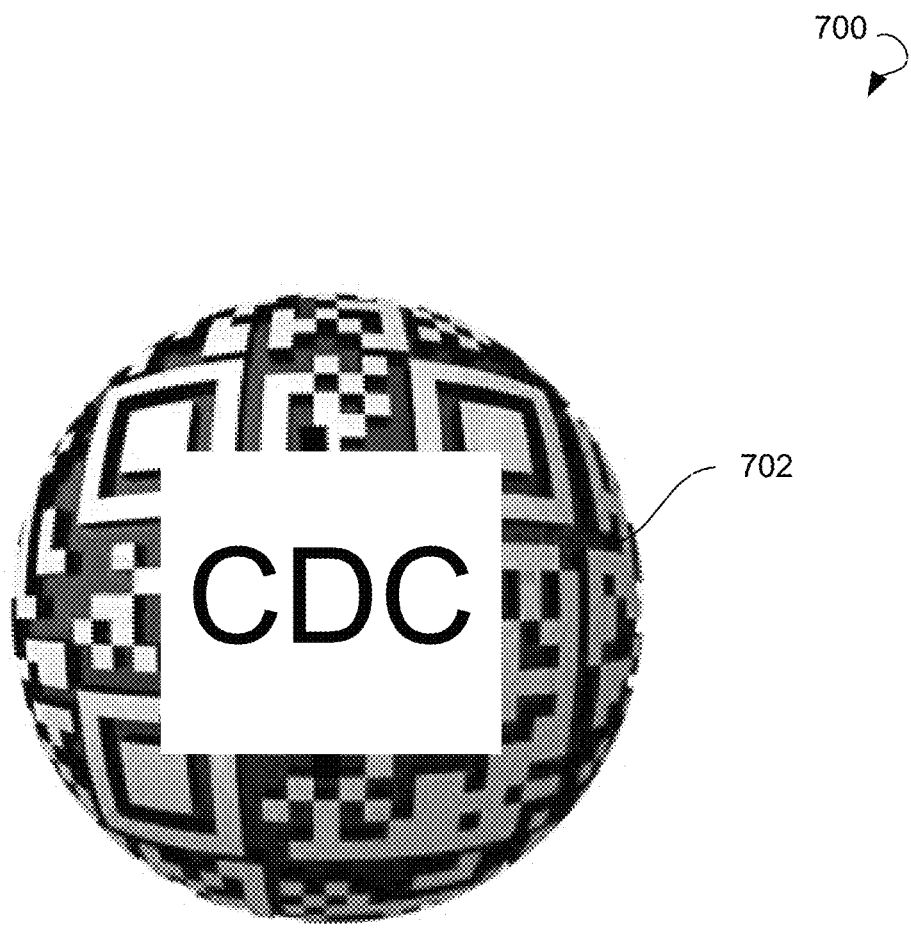
FIG. 7 illustrates a schematic representation of CDCcode, in accordance with an example embodiment.

FIG. 7 illustrates a schematic representation 700 of CDCcode 702, in accordance with an example embodiment. The CDCcode 702 may include a three-dimensional representation of data readable by machine.

Figure 8:
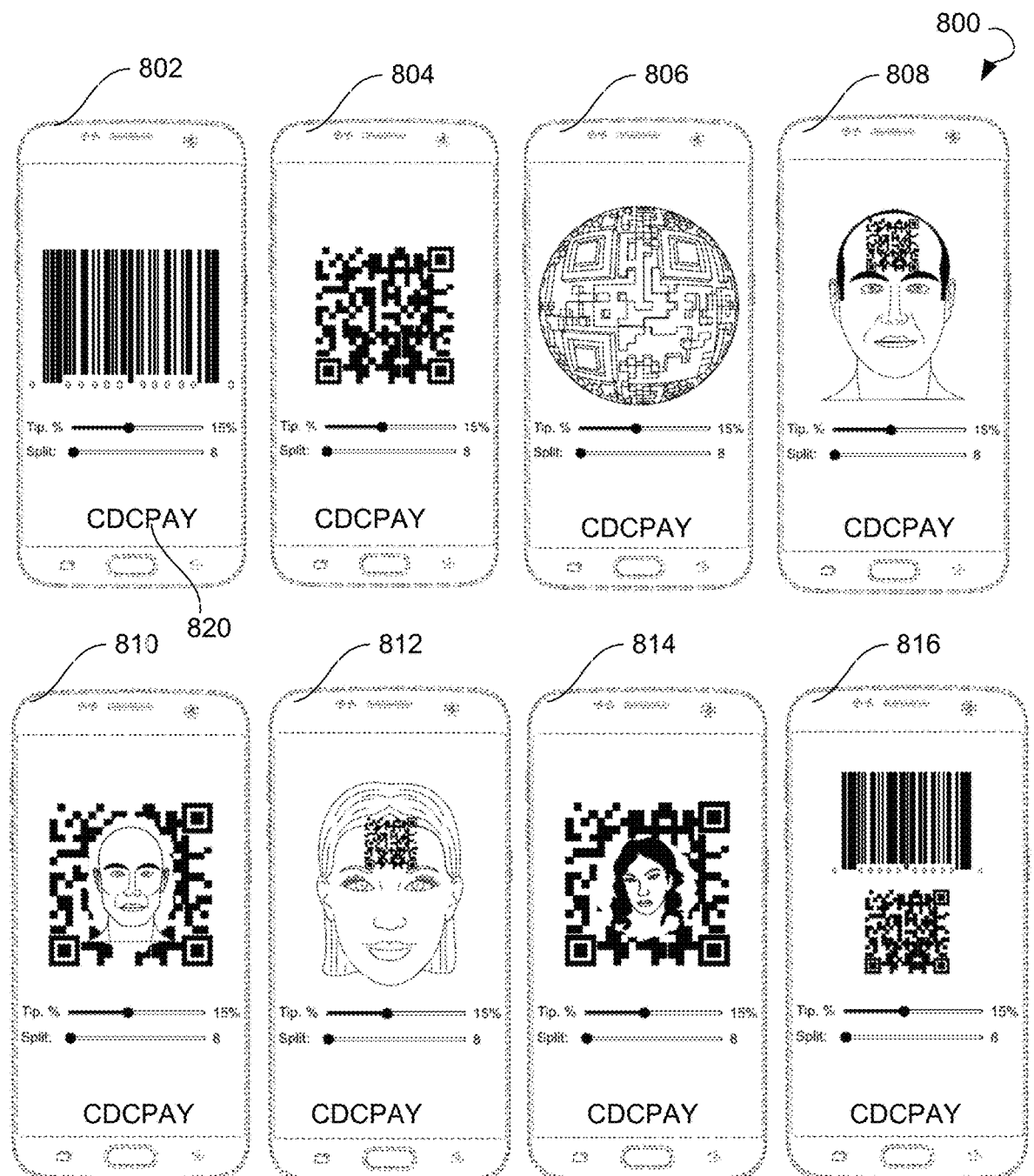
FIG. 8 illustrates various representations of crypto digital currency, in accordance with an example embodiment.

FIG. 8 illustrates various representations 800 of crypto digital currency, in accordance with an example embodiment. Representations 800 show user interfaces of a mobile and wearable device, such as a smartphone, including optical codes encoding data associated with the user. The user interfaces may include an interface 802 with a barcode, an interface 804 with a QR code, an interface 806 with a CDCcode, an interface 808 with a QR code integrated into an image provided by the user, an interface 810 with an image provided by the user integrated in a QR code, an interface 812 with a QR code integrated into an image provided by the user, an interface 814 with an image provided by the user integrated in a QR code, an interface 816 with a barcode and a QR code. In an example embodiment, user interfaces may include settings associated with digital and virtual payments. Example settings may include setting percentage of a tip to be added to the payment and specifying a number of persons, between which the payment is to be split. In an example embodiment, an application running on the mobile and wearable device and associated with a system for crypto digital currency transfers via the mobile and wearable device may be referred to as "CDC-PAY," as shown by element 820.

Figure 9:
FIG. 9 illustrates various representations of crypto digital currency, in accordance with an example embodiment.

FIG. 9 illustrates various representations 900 of crypto digital currency, in accordance with an example embodiment. Representations 900 show user interfaces of a mobile and wearable device, such as a smart watch, including optical codes encoding data associated with the user. The user interfaces of a smart watch may include an interface 902 with a barcode and a QR code, an interface 904 with a barcode, an interface 906 with a QR code, an interface 908 with a CDCcode, an interface 910 with a QR code integrated into an image provided by the user, an interface 912 with an image provided by the user integrated in a QR code. In an example embodiment, user interfaces may include settings associated with digital and virtual payments. Example settings may include setting percentage of a tip to be added to the payment and specifying a number of persons, between which the payment is to be split.

The crypto digital currency may include virtual currencies, cryptocurrencies, digital money, electronic money, electronic currency or central bank issued digital base money, a money balance recorded electronically on a stored-value card, virtual payment card or mobile and wearable devices. Another form of digital electronic money is network money, allowing the transfer of value on computer networks, particularly the Internet. Digital money can either be centralized, where there is a central point of control over the money supply, or decentralized, where the control over the money supply can come from various sources in a global computer digital ledger.

The crypto digital currency may be a type of currency, available in a digital form and not available in physical form, which exhibits properties similar to physical currencies and allows for instantaneous transactions and borderless transfer-of-ownership. Like traditional money, the crypto digital currency may be used to buy physical and services. In an example embodiment, the crypto digital currency may be restricted to certain communities, such as for use inside an on-line game or social network.

The crypto digital currency may be a digital asset designed as a decentralized cryptocurrency to work as a medium of exchange that uses cryptography to secure its transactions, to control the creation of additional units, and to verify the transfer of assets. The cryptocurrency may be classified as a subset of digital currencies and as a subset of alternative digital currencies and virtual currencies. The cryptocurrency may use decentralized control as opposed to centralized electronic money and central banking systems. The decentralized control of the cryptocurrency works through a code block file chain (BLOCKCHAIN), which is a public transaction database, functioning as a distributed ledger with private key to perform peer to peer transactions.

In an example embodiment, the BLOCKCHAIN is a global public ledger for digital currencies of 206 countries. The BLOCKCHAIN records digital currencies transactions without any trusted international central authority: the maintenance of the BLOCKCHAIN is performed by a network of communicating nodes running BLOCKCHAIN software. Transactions of in the crypto digital currency are broadcast to BLOCKCHAIN network using readily available software applications. BLOCKCHAIN network nodes can validate transactions, add them to their copy of the ledger, and then broadcast these ledger additions to other nodes. The BLOCKCHAIN may be a distributed database—to achieve independent verification of the chain of ownership of any and every crypto digital currency amount, each network node may store its own copy of the BLOCKCHAIN. A new group of accepted transactions, a block, may be created substantially multiple time during an hour, added to the BLOCKCHAIN, and published to all nodes. This allows crypto digital currency software to determine when a particular crypto digital currency amount has been spent, which is necessary in order to prevent double-spending in an environment without central oversight. Whereas a conventional ledger records the transfers of actual bills or promissory notes that exist apart from it, the BLOCKCHAIN is the only place that crypto digital currency can be said to exist in the form of unspent outputs of transactions.

In an example embodiment, the crypto digital currency includes a CDCPAY. The CDCPAY may be a combined crypto digital currency of 206 countries. CDCPAY transactions may be defined using a Forth-like scripting language and consist of one or more inputs and one or more outputs. When a user sends crypto digital currency, the user designates each address and the amount of crypto digital currency being sent to that address in an output. To prevent double spending, each input must refer to a previous unspent output in the BLOCKCHAIN. The use of multiple inputs corresponds to the use of multiple CDCPAY in a cash transaction. Since transactions may have multiple outputs, users can send CDCPAY to multiple recipients in one transaction. As in a cash transaction, the sum of inputs (CDCPAY used to pay) can exceed the intended sum of payments. In such a case, an additional output is used, returning the change back to the payer. Any input not accounted for in the transaction outputs become the transaction fee. Paying a transaction fee is optional, users can choose which transactions to process and prioritize those that pay higher fees. Fees are based on the storage size of the transaction generated, which in turn is dependent on the number of inputs used to create the transaction.

In the BLOCKCHAIN, CDCPAY is associated with CDCPAY owner addresses. Creating a CDCPAY address includes picking a random valid private key and computing the corresponding CDCPAY owner address. This computation can be done during a time period substantially less than a second. However, the reverse operation (computing the private key of a given CDCPAY address) is mathematically unfeasible. So, users can tell others and make public a CDCPAY address without compromising its corresponding private key. Moreover, the number of valid private keys is so vast that it is extremely unlikely someone can compute a key-pair that is already in use and has funds. The vast number of valid private keys makes it unfeasible that brute force could be used for that. To be able to spend the CDCPAYs, the owner needs to know the corresponding private key and digitally sign the transaction. The network verifies the signature using the public key. If the private key is lost, the BLOCKCHAIN network or CDCPAY network does not recognize any other evidence of ownership; the CDCPAYs are then unusable, and effectively lost.

In an example embodiment, the mobile or wearable device includes a virtual wallet which stores the information necessary to transact CDCPAYs, for example, the digital credentials for users holdings and allows one to access (and spend) CDCPAYs. While wallets are often described as a place to hold or store CDCPAYs, due to the nature of the system, CDCPAYs are inseparable from the BLOCKCHAIN.

CDCPAY may use public-key cryptography, in which two cryptographic keys, one public and one private, are generated. At its most basic, a wallet may be a collection of these keys.

The virtual wallet may include several types of wallets: software wallets, online wallet, and a physical wallet. Software wallets may connect to the network and allow spending CDCPAYs in addition to holding the credentials that prove ownership. Software wallets can be split further in two categories: full clients and lightweight clients.

Full clients may be a secure and reliable way of using the network, as trust in external parties is not required. They may verify transactions directly on a local copy of the BLOCKCHAIN or a pruned subset of the CDCPAY network. Full clients may check the validity of CDCPAY blocks, preventing them from transacting on a chain that breaks or alters network rules. Because of its size and complexity, storing the entire BLOCKCHAIN is not suitable for all computing devices.

Lightweight clients, on the other hand, may consult full clients to send and receive transactions without requiring a local copy of the entire BLOCKCHAIN. This makes lightweight clients much faster to set up and allows them to be used on low-power, low-bandwidth devices such as smartphones. When using a lightweight wallet, however, the user needs to trust the server to a certain degree, as it can report faulty values back to the user. Lightweight clients may follow the longest BLOCKCHAIN and do not ensure it is valid, requiring trust in system CDCPAY users.

With both types of software wallets, the users are responsible for keeping their private keys in a secure place.

Besides software wallets, Internet services called online wallets may offer similar functionality, but may be easier to use. In this case, credentials to access funds may be stored with the online wallet provider rather than on the user's hardware. As a result, the user should complete trust in the wallet provider.

Physical wallets store the credentials necessary to spend CDCPAYs offline. Examples combine a novelty CDCPAY with these credentials printed on metal. Paper wallets may include paper printouts.

CDCPAY may have a pseudonymous privacy, which means that funds are not tied to a central bank or real-world entities, but rather CDCPAY addresses. CDCPAY owners of CDCPAY addresses may be not explicitly identified, but all transactions on the BLOCKCHAIN may be public. In addition, CDCPAY transactions can be linked to individuals and companies through idioms of use, transactions that spend CDCPAYs from multiple inputs may indicate that the inputs may have a common owner and corroborating public transaction data with known information on owners of certain addresses. Additionally, CDCPAY exchanges, where CDCPAYs are traded for traditional currencies, may be required by law to collect personal information.

In an example embodiment, to heighten financial privacy, a new CDCPAY address may be generated for each transaction. Specifically, hierarchical deterministic wallets may generate pseudorandom, rolling addresses for every transaction from a single seed, while only requiring a single passphrase to be remembered to recover all corresponding private keys. CDCPAY exchanges and other entities may prove assets, liabilities, and solvency without revealing their addresses using zero-knowledge proofs.

The validity of each CDCPAY unit may be provided by the BLOCKCHAIN. The BLOCKCHAIN is a continuously growing list of records, called blocks, which are linked and secured using cryptography. Each block may contain a hash pointer as a link to a previous block, a timestamp and transaction data. The BLOCKCHAIN is resistant to modification of the data. It may be an open, distributed ledger that can record transactions between two parties efficiently and in a verifiable and permanent way. For use as a distributed ledger, the BLOCKCHAIN may be managed by a peer-to-peer network collectively adhering to a protocol for validating new blocks. Once recorded, the data in any given block cannot be altered retroactively without the alteration of all subsequent blocks, which requires collusion of the network majority.

In an example embodiment, a banking account may be associated with a digital or virtual currency account providing for transactions between these accounts. Such transactions, peer-to-peer transfers, and other services related to the crypto digital currency network may be free of any fees. The services related to the crypto digital currency network may be provided on a subscription basis. Subscribers may be identified with one or more of the following: an email address and a mobile phone number. The user may perform a transfer with only an email address or a mobile phone number of a recipient on condition that the recipient is registered with the crypto digital currency network and has an email address and a mobile phone number specified as his identifier.

In some example embodiments, the BLOCKCHAIN is a distributed computing system with high Byzantine fault tolerance. Decentralized consensus may be achieved with the BLOCKCHAIN. It may solve the double spending problem without the need of a trusted authority or central server.

A block time is the average time it takes for the network to generate one extra block in the BLOCKCHAIN. By the time of block completion, the included data becomes verifiable. This is practically when the money transaction takes place, so a shorter block time means faster transactions.

CDCPAY may use various time stamp schemes to avoid the need for a trusted third party to timestamp transactions added to the BLOCKCHAIN ledger. Securing a CDCPAY cryptocurrency network and achieving distributed consensus may be implemented through requesting users to show ownership of a certain amount of currency or running hashing algorithms to validate electronic transactions.

In an example embodiment, CDCPAY mobile or wearable cryptocurrency wallet stores the public and private keys or CDCPAY addresses, which can be used to receive or spend the CDCPAY cryptocurrency. With the private key, it is possible to write in the public ledger, effectively spending the associated cryptocurrency. With the public key, it is possible for others to send currency to the wallet.

CDCPAY cryptocurrency may be pseudonymous rather than anonymous in that the CDCPAY cryptocurrency within a wallet may be not tied to people, but rather to one or more specific keys or CDCPAY addresses. Thereby, CDCPAY cryptocurrency owners may be not identifiable, but all transactions may be publicly available in the BLOCKCHAIN. Still, CDCPAY cryptocurrency exchanges may be required by law to collect the personal information of their users.

CDCPAY crypto digital currency may include a virtual currency or virtual money, which is issued and controlled by its developers, and used and accepted among the members of a specific virtual community. The virtual currency may be a digital representation of value which is accepted by natural or legal persons as a means of payment and can be transferred, stored or traded electronically.

Figure 10:
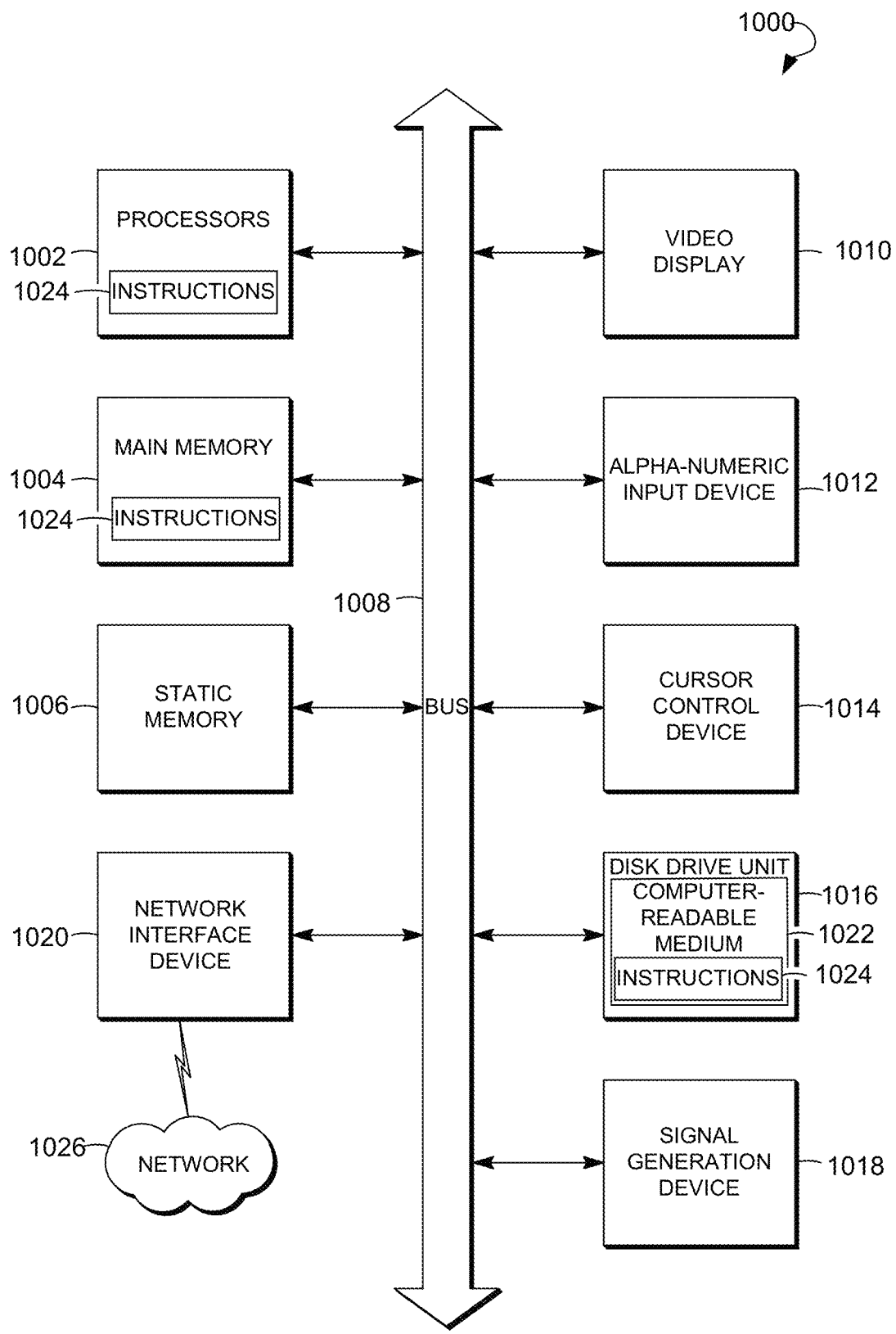
FIG. 10 is a diagrammatic representation of a computing device for a machine in the exemplary electronic form of a computer system, within which a set of instructions for causing the machine to perform any one or more of the methodologies discussed herein can be executed.

FIG. 10 shows a diagrammatic representation of a machine in the example electronic form of a computer system 1000, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 may also include an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a non-transitory computer-readable medium 1022, on which is stored one or more sets of instructions and data structures (e.g., instructions 1024) embodying or utilized by any one or more of the methodologies or functions described herein. The instructions 1024 may also reside, completely or at least partially, within the main memory 1004 and/or within the processors 1002 during execution thereof by the computer system 1000. The main memory 1004 and the processors 1002 may also constitute machine-readable media.

The instructions 1024 may further be transmitted or received over a network 1026 via the network interface device 1020 utilizing any one of a number of well-known transfer protocols (e.g., Hyper Text Transfer Protocol (HTTP)).

While the non-transitory computer-readable medium 1022 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile device payments, multimedia capture, calling, and messaging via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system for crypto digital currency transfers via a mobile and wearable device, the system comprising:
   a processor configured to:
      receive over a data network, from the mobile and wearable device of a user, a transfer request, wherein the transfer request includes a transfer amount in crypto digital currency and user identification data associated with the user, wherein the user identification data includes at least a personal identification number (PIN);
      in response to the transfer request, retrieve, from a storage unit, payment data of the user associated with the identification data;
      based on the retrieving and the transfer amount, generate an optical code encoding the payment data and the transfer amount, the optical code include one of the following: a barcode and a Quick Response (QR) code;
      provide the optical code on a screen of the mobile and wearable device, wherein, on scanning of the optical code, a transfer receiving request is created;
      receive a transfer receiving request to perform a payment transaction associated with the user, the transfer receiving request including at least the payment data, the transfer amount, and recipient identification data associated with a recipient;
      based on the transfer receiving request, access a user account maintained by a currency issuance unit;
      transfer the transfer amount in the crypto digital currency to a recipient account associated with the recipient identification data;
   a currency issuance unit connected over the data network to and remotely located from the processor, the recipient, and the mobile and wearable device operable to:
      based on the payment data associated with the user and the user identification data, generate the crypto digital currency, the crypto digital currency having a deposit amount, the deposit amount being at least equal to the transfer amount requested by the user in the transfer request; and
      provide the crypto digital currency to the user account; and
   a storage unit operable to store at least the user identification information, the payment data of the user, the crypto digital currency, the recipient identification data, wherein the processor, the mobile and wearable device, the currency issuance unit, and the storage unit are remotely located from each other and are in operable connection over the data network;
   wherein the mobile and wearable device is associated with a cloud-based application running on the mobile and wearable device, wherein the cloud-based application resides in a cloud network and is provided on the mobile and wearable device via one or more of the following: a web browser, a graphical user interface, a projector, a hologram, an augmented reality (AR) device; a virtual reality (VR) device;
   wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;
   wherein the cloud-based application is provided free of charge or at a predetermined price;
   wherein the cloud-based application includes at least a bank account emulation (BAE) client, the BAE client is configured to provide emulation of a bank account to combine with cloud computing and provide an emulated digital currency, wherein the crypto digital currency provided to the user account by the currency issuance unit includes the emulated crypto digital currency, wherein the crypto digital currency is valid on the user account for a predetermined amount of time for the transferring of the transfer amount in the crypto digital currency to the recipient account, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated digital currency for transaction, an NFC command is routed to the BAE client for verification of the NFC commands by the cloud-based application managing the emulation of the bank account;

wherein the cloud-based application is configured to connect to a backend associated with the currency issuance unit to complete the transaction;

wherein the cloud-based application is associated with a trusted tokenization node, the trusted tokenization node being a shared resource used to generate and de-tokenize tokens representing data associated with the digital currency at the backend associated with the issuance unit;

wherein the BAE client provides multi-level security by providing limited use keys, tokenization, device biometric recognition, and dynamic risk analysis, wherein the limited use keys are derived from a master domain key shared by the issuance unit, wherein a use of the limited use keys is associated with time to live of the limited use keys and a number of transactions to be performed using the limited use keys, wherein the device biometric recognition is based on fingerprints profiles or face profiles associated with the mobile and wearable device and are used to determine that transactions are initiated only by an authorized mobile and wearable device at recognized locations of the POS terminal;

wherein each payment in the crypto digital currency is permanently written into an open-sourced code Blocck file chain (blockchain);

wherein the blockchain is a cryptographically authenticated database that acts as a public online ledger configured to handle a predetermined number of transactions per second;

wherein the crypto digital currency is associated with a code block file chain (CBFC) community of a crypto digital currency association (CDC association); and wherein the blockchain is operated and constantly verified by the members of the CDC association operating as a validator node operator; wherein the blockchain tracks an amount of the crypto digital currency of the user.

2. The system of claim 1, wherein members of the CDC association vote in respect of governance of issuance of the crypto digital currency, wherein the CDC association promotes an open-sourced code block file chain (blockchain) and a developer platform having a coding programming language, incentivizes businesses to accept the crypto digital currency for payment, and incentivizes customers by providing discounts and rewards to the customers.

3. The system of claim 2, wherein the crypto digital currency is associated with a plurality of payments of the user, wherein data on the plurality of payments is unavailable to third parties and unavailable advertisement targeting; wherein user identity associated with the user is invisible to publicly visible transactions; wherein members of the CDC association earn interest based on holding the crypto digital currency in a crypto digital currency reserve to keep a value of the crypto digital currency active and stable, wherein the CDC association uses the crypto digital currency reserve to provide a plurality of services to governments and a private sector, the plurality of services including: providing depositories for bank reserves, lending to banks to cover short-term fund deficits, seasonal business cycles, and extraordinary liquidity demands, collecting and clearing payments between banks, issuing bank notes for circulation as currency, administering deposit accounts of the governments, and conducting auctions and buybacks of debt of the governments.

4. The system of claim 2, wherein the processor is further operable to incentivize users of the CDC association for making payments in the crypto digital currency, wherein the payments are associated with one or more of the following: microtransactions associated with a predetermined transaction fee and a pre-paid transit pass.

5. The system of claim 2, wherein the processor is further operable to set a permission for a member of the CDC association to be a validator node operator of the crypto digital currency, gain a vote in the CDC association, and be entitled to a share of dividends from interest earned on the crypto digital currency reserve into which users pay fiat currency to receive the crypto digital currency.

6. The system of claim 5, wherein the processor is further configured to incentivize the members of the CDC association to act as the validator node operator for the blockchain associated with the crypto digital currency, fundraising, designing incentive programs to reward users and providing social impact grants;

wherein the CDC association has a council, a representative from each member to choose a managing director of the CDC association, appoint an executive team, and elect a board of a predetermined amount of top representatives;

wherein the blockchain associated with the crypto digital currency is designed to transition a node membership from the members who create an ecosystem of the crypto digital currency to users who hold the crypto digital currency.

7. The system of claim 2, wherein each of the members of the CDC association has one vote, two votes, or 1% of the total vote to provide a level of decentralization to protect against hijacking of the crypto digital currency, avoid sole ownership and dominion crypto digital currency CDC, avoid extra scrutiny from regulators who investigate privacy abuses and anti-competitive behavior.

8. The system of claim 2, wherein the value of the crypto digital currency is associated with a pool of assets including bank deposits and short-term government securities for historically stable international currencies, the historically stable international currencies including a dollar, pound, euro, Swiss franc, and yen; wherein the CDC association maintains the pool of assets and changes a balance of composition of the pool of assets to offset price fluctuations in a foreign currency to make the value of the crypto digital currency consistent with the price fluctuations.

9. The system of claim 8, wherein the CDC association continuously determines an exact value of the crypto digital currency and keeps the crypto digital currency stable in associated with a value of a dollar, euro or pound to conceptualize the crypto digital currency.

10. A method for crypto digital currency transfers via a mobile and wearable device, the method comprising:

receiving over a data network, by a processor, from the mobile and wearable device of a user, a transfer request, wherein the transfer request includes a transfer amount in crypto digital currency and user identification data associated with the user wherein the user identification data includes at least a personal identification number (PIN);

in response to the transfer request, retrieving, from a storage unit, payment data of the user associated with the identification data;

based on the retrieving, generating an optical code encoding the payment data and the transfer amount, the optical code include one of the following: a barcode and a Quick Response (QR) code;

providing the optical code on a screen of the mobile and wearable device, wherein, on scanning of the optical code, a transfer receiving request is created;

receiving a transfer receiving request to perform a transaction associated with the user, the transaction request including at least the payment data, the transfer amount, and recipient identification data associated with a recipient;

based on the transfer receiving request, accessing a user account maintained by a currency issuance unit;

transferring the transfer amount in the crypto digital currency to a recipient account associated with the recipient identification data;

wherein the processor, the mobile and wearable device, the currency issuance unit, and the storage unit are remotely located with each other and in operable connection over the data network;

wherein the mobile and wearable device is associated with a cloud-based application running on the mobile and wearable device, wherein the cloud-based application resides in a cloud network and is provided on the mobile and wearable device via one or more of the following: a web browser, a graphical user interface, a projector, and a hologram, an augmented reality (AR) device; a virtual reality (VR) device;

wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;

wherein the cloud-based application is provided free of charge or at a predetermined price;

wherein the cloud-based application includes at least a bank account emulation (BAE) client, the BAE client is configured to provide emulation of a bank account to combine with cloud computing and provide an emulated digital currency, wherein the crypto digital currency provided to the user account by the currency issuance unit includes the emulated crypto digital currency, wherein the crypto digital currency is valid on the user account for a predetermined amount of time for the transferring of the transfer amount in the crypto digital currency to the recipient account, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated digital currency for transaction, an NFC command is routed to the BAE client for verification of the NFC commands by the cloud-based application managing the emulation of the bank account;

wherein the cloud-based application is configured to connect to a backend associated with the currency issuance unit to complete the transaction;

wherein the cloud-based application is associated with a trusted tokenization node, the trusted tokenization node being a shared resource used to generate and de-tokenize tokens representing data associated with the digital currency at the backend associated with the issuance unit;

wherein the BAE client provides multi-level security by providing limited use keys, tokenization, device biometric recognition, and dynamic risk analysis, wherein the limited use keys are derived from a master domain key shared by the issuance unit, wherein a use of the limited use keys is associated with time to live of the limited use keys and a number of transactions to be performed using the limited use keys, wherein the device biometric recognition is based on fingerprints profiles or face profiles associated with the mobile and wearable device and are used to determine that transactions are initiated only by an authorized mobile and wearable device at recognized locations of the POS terminal;

wherein each payment in the crypto digital currency is permanently written into an open-sourced code block file chain (blockchain);

wherein the blockchain is a cryptographically authenticated database that acts as a public online ledger configured to handle a predetermined number of transactions per second;

wherein the crypto digital currency is associated with a code block file chain (CBFC) community of a crypto digital currency association (CDC association); and wherein the blockchain is operated and constantly verified by the members of the CDC association operating as a validator node operator; wherein the blockchain tracks an amount of the crypto digital currency of the user.

11. The method of claim 10, further comprising receiving, by the cloud-based application, a request from the user to trade in local currency for the crypto digital currency or trade in the crypto digital currency for the local currency; and in response to the request, exchange the local currency for the crypto digital currency or exchange the crypto digital currency for the local currency.

12. The method of claim 10, further comprising:

receiving a first amount of a local currency from the user;

in response to the receipt of the first amount of the local currency, emitting a first amount of the crypto digital currency and providing the first amount of the crypto digital currency to the user, the first amount of the crypto digital currency corresponding to the first amount of the local currency;

providing the local currency to a crypto digital currency reserve, receiving, from the user, a second amount of the crypto digital currency from the user;

in response to the receipt of the second amount of the crypto digital currency, providing a second amount of local currency to the user and destroying the second amount of the crypto digital currency in the blockchain.

13. The method of claim 12, further comprising:

receiving a membership fee from members of a CDC association associated with the crypto digital currency;

providing investment tokens to the members in response to the receipt of the membership fee;

wherein a share of the investment tokens translates into a proportion of a dividend the members earn of an interest on assets in the crypto digital currency reserve; wherein the dividend is paid out to the members after operating expenses, investments in the ecosystem, engineering research and grants are paid by the CDC association.

14. The method of claim 13, wherein upon submission of a transaction in the crypto digital currency, each of nodes of the blockchain runs a calculation based on an existing ledger of all transactions, wherein two-thirds of the nodes determine the transaction to be legitimate for the transaction to be executed and written to the blockchain; wherein transactions in the crypto digital currency are unreverseable; wherein when over one-third of the nodes are compromised by an attacker, a fork of nodes is created in the blockchain to temporarily halt transactions, determine an extent of a damage and recommend updates to the blockchain to resolve the compromising.

15. The method of claim 14, wherein the blockchain is open source to enable a developer to build applications that work with the blockchain using a coding language; wherein the applications are configured to move the crypto digital currency between accounts and avoid duplication of the crypto digital currency.

16. The method of claim 15, wherein the developer creates smart contracts for programmatic interactions with the blockchain; wherein the CDC association encourages developers and merchants to work with the crypto digital currency by issuing incentives to validator node operators for signing users for using the crypto digital currency; wherein the user is awarded for using wallets of the crypto digital currency for over half year; wherein, for each transaction, merchants receive a percentage of an amount of the transaction;

wherein the user accumulates incentives, passes a portion or all of the incentives to users in the form of free crypto digital currency or discounts on purchases to further users;

wherein the merchants provide a discount for the user for paying in the crypto digital currency;

wherein the user receives an additional amount of the crypto digital currency when the user completes a predetermined number of transactions within a predetermined period.

17. The method of claim 16, further comprising providing wallets associated with the crypto digital currency, wherein the wallets are built by third parties, wherein the wallets are used to send money between users and pay for a product or a service, wherein the wallets are installed in the cloud-based application, wherein the user registers in the cloud-based application using an anti-fraud procedure by providing a government-issued photo ID and verification information associated with the user.

18. The method of claim 17, wherein the user uses the cloud-based application to exchange the local currency to the crypto digital currency, select a user or a merchant to send the crypto digital currency, set an amount of the crypto digital currency to send, and add a description of a transaction made in the crypto digital currency; wherein the user uses the cloud-based application to request to pay to the merchant for products and services at a merchant outlet, wherein transactions in the crypto digital currency are made securely from a bank account of the user.

19. The method of claim 18, wherein the merchant receives payments from the user by scanning the QR code using a camera of the merchant; wherein the QR code provides a contactless payment by scanning the QR code displayed by the cloud-based application.

* * * * *